United States Patent [19]

Tzikas

[11] Patent Number: 4,925,927

[45] Date of Patent: May 15, 1990

[54] REACTIVE DYES CONTAINING A VINYLSULFONYLAMINOCARBONYL GROUP BOUND TO BIS-(TRIAZENYLAMINO)-BENZENE AS BRIDGING MEMBER OF TWO CHROMOPHORIC SYSTEMS

[75] Inventor: Athanassios Tzikas, Pratteln, Switzerland

[73] Assignee: Ciba-Geigy Corporation, Ardsley, N.Y.

[21] Appl. No.: 212,393

[22] Filed: Jun. 27, 1988

[30] Foreign Application Priority Data

Jul. 3, 1987 [CH] Switzerland ................ 2542/87

[51] Int. Cl.$^5$ ............ C09B 62/002; C09B 62/022; C09B 62/04; D06P 1/382
[52] U.S. Cl. ............................... 534/618; 534/617; 534/622; 534/624; 534/629; 534/634; 534/641; 540/126; 544/181; 544/187; 544/209
[58] Field of Search .......... 534/622, 624, 618, 634, 534/617, 641; 540/12 C; 544/181, 187, 209

[56] References Cited

U.S. PATENT DOCUMENTS

3,223,470 12/1965 Boedeker et al. ............ 534/638 X
4,507,236 3/1985 Seiler et al. ............... 534/634
4,754,023 6/1988 Lzikas ....................... 534/618

FOREIGN PATENT DOCUMENTS

0179019 4/1986 European Pat. Off. ........... 534/634
0221013 5/1987 European Pat. Off. ........... 534/638
0252508 1/1988 European Pat. Off. ........... 534/634
2001960 7/1970 Fed. Rep. of Germany ...... 534/634
2611550 9/1976 Fed. Rep. of Germany ...... 534/634
WO87/01123 7/1987 PCT Int'l Appl. ............... 534/630
854432 11/1960 United Kingdom ............. 534/634
1283771 8/1972 United Kingdom ............. 534/634
1461125 1/1977 United Kingdom ............. 534/634
1529645 10/1978 United Kingdom ............. 534/634
2026527B 2/1980 United Kingdom ............. 534/638
1576237 10/1980 United Kingdom ............. 534/638

*Primary Examiner*—Lloyd D. Higel
*Attorney, Agent, or Firm*—George R. Dohmann; Edward McC. Roberts

[57] ABSTRACT

Reactive dyes which are particularly suitable for dyeing or printing cellulose-containing fiber materials by the exhaust method or by continuous methods having the formula

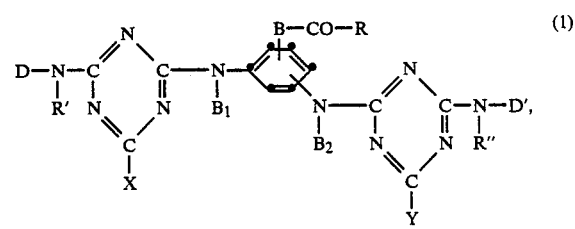

in which D and D' are each independently of the other a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, R', R'', $B_1$ and $B_2$ are independently of each other hydrogen or alkyl which has 1 to 4 carbon atoms and which is unsubstituted or substituted by halogen, hydroxyl, cyano, $C_1$–$C_4$-alkoxy, $C_1$–$C_4$-alkoxycarbonyl, carboxyl, sulfamoyl, sulfo or sulfato, X and Y are independently of each other fluorine, chlorine, bromine, sulfo, $C_1$–$C_4$-alkylsulfonyl or phenylsulfonyl, B is a direct bond or a radical $-(CH_2)_n-$ or $-O-(CH_2)_n-$, n is 1 to 6; R is a radical of the formula

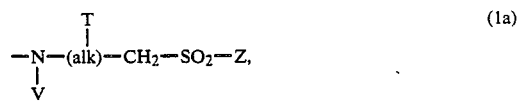

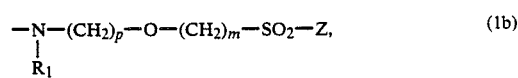

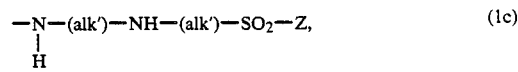

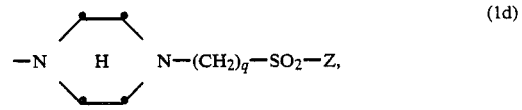

Z is $\beta$-sulfatoethyl, $\beta$-thiosulfatoethyl, $\beta$-phosphatoethyl, $\beta$-acetoxyethyl, $\beta$-haloethyl or vinyl; alk is alkylene having 1 to 6 carbon atoms or a branched isomer thereof; T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or a radical $-SO_2-Z$ in which Z is as defined above, V is hydrogen or alkyl which has 1 to 4 carbon atoms and can be substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfonyl, N,N-dimethylsulfamoyl, N,N-diethylsulfamoyl, methylsulfonyl, ethylsulfonyl, propylsulfonyl, alkoxy groups having 1 or 2 carbon atoms, halogen or hydroxyl, or a radical

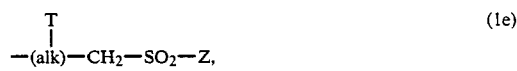

in which Z, alk and T are as defined above, $R_1$ is hydrogen or $C_1$–$C_6$-alkyl, each alk' is independently of the other one polymethylene having 2 to 6 carbon atoms or a branched isomer thereof, and m is 1 to 6, p is 1 to 6 and q is 1 to 6.

27 Claims, No Drawings

REACTIVE DYES CONTAINING A VINYLSULFONYLAMINOCARBONYL GROUP BOUND TO BIS-(TRIAZENYLAMINO)-BENZENE AS BRIDGING MEMBER OF TWO CHROMOPHORIC SYSTEMS

The present application relates to novel improved reactive dyes which are suitable in particular for dyeing cellulose-containing fibre materials by the exhaust method or by continuous methods and which produce wet-and light-fast dyeings, to processes for preparing these dyes, and to the use thereof for dyeing or printing textile materials.

The invention provides reactive dyes of the formula

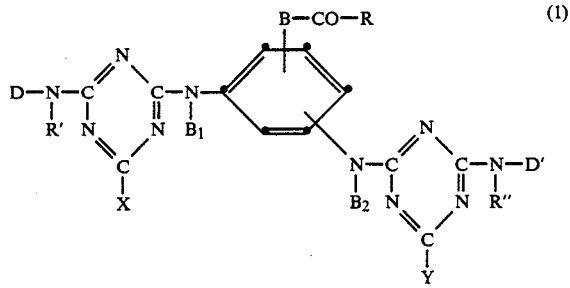

in which D and D' are each independently of the other a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, R', R'', $B_1$ and $B_2$ are independently of each other hydrogen or alkyl which has 1 to 4 carbon atoms and which can be substituted by halogen, hydroxyl, cyano, $C_{1-4}$alkoxy, $C_{1-4}$alkoxycarbonyl, carboxyl, sulfamoyl, sulfo or sulfato, X and Y are independently of each other fluorine, chlorine, bromine, sulfo, $C_{1-4}$alkylsulfonyl or phenylsulfonyl, B is a direct bond or a radical $-(CH_2)_n-$ or $-O-(CH_2)_n-$, n is 1 to 6, R is a radical of the formula

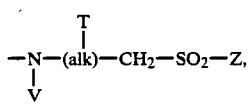

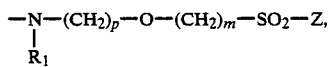

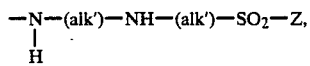

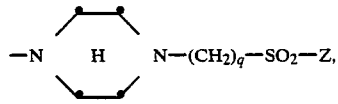

Z is β-sulfatoethyl, β-thiosulfatoethyl, β-phosphatoethyl, β-acyloxyethyl, β-haloethyl or vinyl, alk is an alkylene radical having 1 to 6 C atoms or a branched isomer thereof, T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical $-SO_2-Z$ in which Z is as defined above, V is hydrogen or an alkyl radical which has 1 to 4 C atoms and can be substituted by carboxyl or sulfo groups or by derivatives thereof, or by alkoxy groups having 1 or 2 C atoms, halogen or hydroxyl, or a radical

in which Z, alk and T are as defined above, $R_1$ is hydrogen or $C_{1-6}$-alkyl, each alk' is independently of the other one a polymethylene radical having 2 to 6 C atoms or a branched isomer thereof, and m is 1 to 6, p is 1 to 6 and q is 1 to 6.

The radical D or D' in the formula (1) can contain, bonded to its basic structure, the substituents customary with organic dyes.

Examples of further substituents in the radical D or D' are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfa-moyl, N-isopropylsulfamoyl or N-butylsulfamoyl, N-(β-hydroxyethyl)-sulfamoyl, N,N-di-(β-hydroxyethyl)sulfamoyl, N-phenylsulfamoyl, ureido, hydroxyl, carboxyl, sulfomethyl or sulfo. Preferably the radical D or D' contains one or more sulfonic acid groups. Reactive dyes of the formula (1) in which D or D' is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical R', R'', $B_1$ or $B_2$ is straight-chain or branched; it can be further substituted, for example by halogen, hydroxyl, cyano, $C_{1-4}$-alkoxy, $C_{1-4}$alkoxycarbonyl, carboxyl, sulfamoyl, sulfo or sulfato. Examples of R, R'', $B_1$ and $B_2$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably, R', R'', $B_1$ and $B_2$ are each independently of the other hydrogen, methyl or ethyl.

The substituents X and Y which are detachable as anions are each a halogen atom, such as fluorine, chlorine or bromine, a low molecular weight alkylsulfonyl group, such as methylsulfonyl or ethylsulfonyl, a phenylsulfonyl radical or a sulfo group. Preferably X and Y are fluorine or chlorine.

The radical B contains 1 to 6, preferably 1 to 4, carbon atoms; examples of B are: methylene, ethylene, propylene, butylene, methyleneoxy, ethyleneoxy, propyleneoxy and butyleneoxy. A —O—(CH$_2$)$_n$— radical B is bonded to the benzene ring via the oxygen atom. Preferably, B is a direct bond.

A β-haloethyl Z and a β-acyloxyethyl Z are in particular a β-chloroethyl and a β-acetoxyethyl radical respectively. The alkylene radical alk is preferably methylene, ethylene, methylmethylene, propylene or butylene. An acyloxy radical T is in particular acetyloxy, propionyloxy or butyryloxy, and an alkoxycarbonyl radical T is in particular methoxycarbonyl, ethoxycarbonyl or propyloxycarbonyl. An alkyl radical V can be methyl, ethyl, propyl, isopropyl, butyl, isobutyl, sec-butyl or tert-butyl. Derivatives of the carboxyl or sulfo group are for example carbamoyl, N-methyl-, N-ethyl-, N,N-dimethyl- and N,N-diethylcarbamoyl, cyano, acetyl, propionyl, butyryl, methoxycarbonyl, ethoxycarbonyl, propyloxycarbonyl, sulfamoyl, N-methyl-, N-ethyl-, N,N-dimethyl- and N,N-diethylsulfamoyl, methylsulfonyl, ethylsulfonyl and propylsulfonyl. The radical R$_1$ is for example methyl, ethyl, propyl, isopropyl, butyl, isobutyl, sec-butyl, tert-butyl, pentyl or hexyl, or preferably hydrogen. The polymethylene radicals alk' are preferably ethylene, propylene or butylene. The indices m, p and q are independent of one another and preferably 2, 3 or 4.

The middle portion in formula (1) which joins the two dye radicals D and D' is a reactive grouping in which X and Y are fibre-reactive leaving groups which can be identical or different; preferably X and Y are identical. In addition the radical R has a reactive radical, namely the group —SO$_2$—Z; this reactive radical contains a leaving group, for example when Z is β-chloroethyl, or can become active in the manner of fibre-reactive groups, for example when Z is vinyl (for fundamentals about reactive dyes see Venkataraman, K.: The Chemistry of Synthetic Dyes. N. Y.: Academic Press 1972; Vol. VI, Reactive Dyes).

Also suitable are reactive dyes of the formula (1) in which the radical D or D' contains a further reactive radical. The additional reactive radicals included in D or D' can be bonded to D or D' via amino groups or in some other way, for example by a direct bond.

Any additional reactive radical included in D or D' is, or contains, in particular a low molecular weight alkanoyl or alkylsulfonyl radical substituted by a detachable atom or a detachable group, a low molecular weight alkenoyl or alkenesulfonyl radical which can be substituted by a detachable atom or a detachable group, a carbocyclic or heterocyclic radical which contains 4-, 5- or 6-rings, is substituted by a detachable atom or a detachable group and bonded via a carbonyl or sulfonyl group, or a triazine or pyrimidine radical bonded directly by a carbon atom and substituted by a detachable atom or a detachable group. Examples of such reactive radicals are a six-membered heterocyclic radical bonded via an amino group and containing halogen atoms, such as a halotriazine or halopyrimidine radical, or an aliphatic acyl radical, such as a haloacetyl or halopropionyl radical.

In particular, the additional reactive radical is a vinylsulfonyl, β-sulfatoethylsulfonyl, β-thiosulfatoethylsulfonyl, β-chloroethylsulfonyl or β-acetoxyethylsulfonyl radical bonded directly or via a bridge member.

Preferred embodiments of the reactive dyes of the formula (1) are: (a) reactive dyes of the formula (1) in which the radicals D-N(R')- and D'-N(R")- are identical; (b) reactive dyes according to (a) in which X and Y are identical and are chlorine or fluorine; (c) reactive dyes according to (b), in which R' and R" are hydrogen, methyl or ethyl; (d) reactive dyes according to (c), in which B$_1$ and B$_2$ are hydrogen; (e) reactive dyes according to (d), of the formula

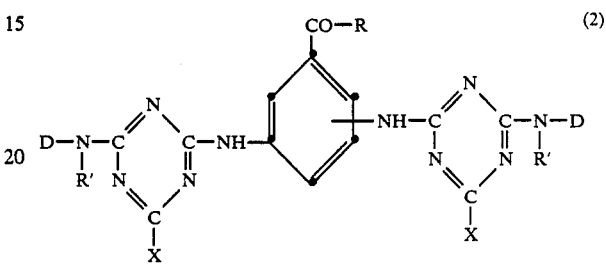

in which D, R', X and R are as defined for (d); (f) reactive dyes according to (e) in which D is the radical of a monoazo or disazo dye; (g) reactive dyes according to (e) in which D is the radical of a metal complex azo or formazan dye; (h) reactive dyes according to (f) in which D is a monoazo or disazo dye radical of the formula

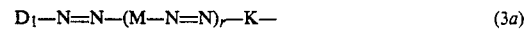

$$D_1-N=N-(M-N=N)_r-K- \quad (3a)$$

or

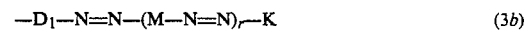

$$-D_1-N=N-(M-N=N)_r-K \quad (3b)$$

or of a metal complex derived therefrom, D$_1$ is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetoacetylarylamide series, where D$_1$, M and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms, r is 0 or 1, and D$_1$, M and K together contain at least two sulfo groups, preferably three or four sulfo groups; (i) reactive dyes according to (g) in which D is the radical of a 1:1 copper complex azo dye of the benzene or naphthalene series and the copper atom is bonded on each side to a metallizable group in the ortho-position relative to the azo bridge; (j) reactive dyes according to (g) in which D is the radical of a formazan dye of the formula

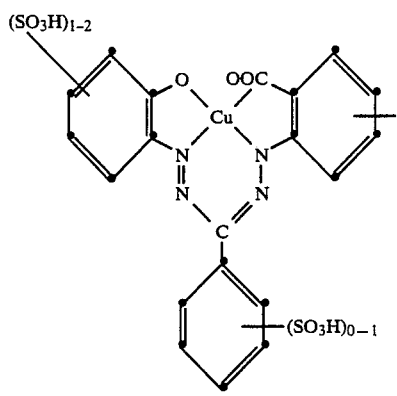
(4a)

or

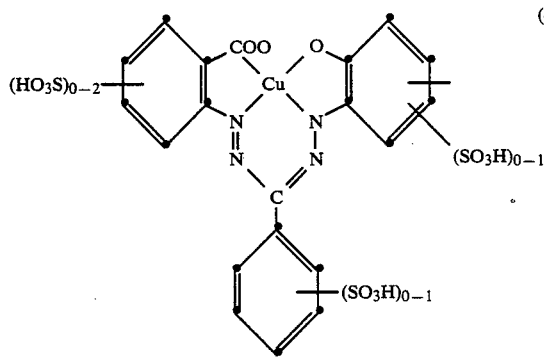
(4b)

in which the benzene nuclei can be further substituted by alkyl having 1 to 4 C atoms, alkoxy having 1 to 4 C atoms, alkylsulfonyl having 1 to 4 C atoms, halogen or carboxyl.

Preference is given in particular to reactive dyes according to (h) in which D is a radical of the following formulae (5) to (17):

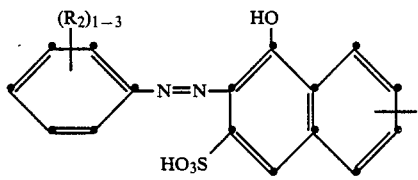
(5)

in which $R_2$ is 1 to 3 substituents from the group consisting of $C_{1-4}$-alkyl, $C_{1-4}$alkoxy, halogen, carboxyl and sulfo;

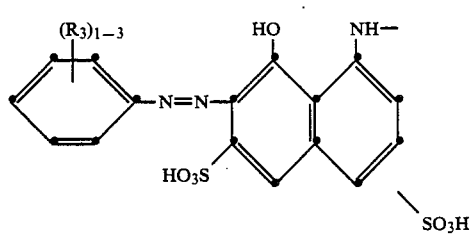
(6)

in which $R_3$ is 1 to 3 substituents from the group consisting of $C_{1-4}$-alkyl, $C_{1-4}$alkoxy, halogen, carboxyl and sulfo;

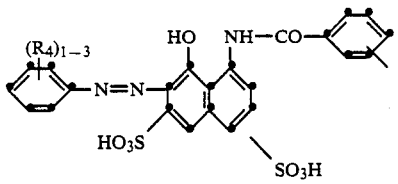
(7)

in which $R_4$ is 1 to 3 substituents from the group consisting of $C_{1-4}$-alkyl, $C_{1-4}$alkoxy, halogen, carboxyl and sulfo;

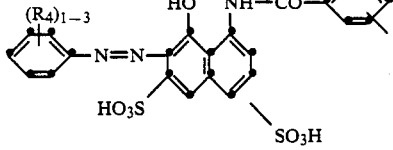
(8)

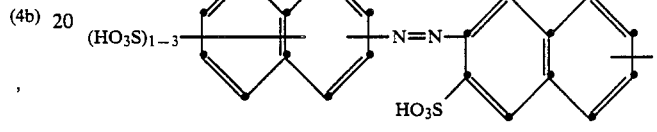
(9)

in which $R_5$ is 1 to 4 independently selected substituents from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and sulfo;

(10)

(11)

in which $R_6$ is $C_{1-4}$alkanoyl or benzoyl;

(12)

in which $R_7$ is $C_{1-4}$alkanoyl or benzoyl;

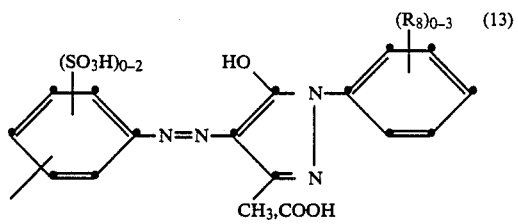

in which $R_8$ is 0 to 3 substituents from the group consisting of $C_{1-4}$-alkyl, $C_{1-4}$alkoxy, halogen, carboxyl and sulfo;

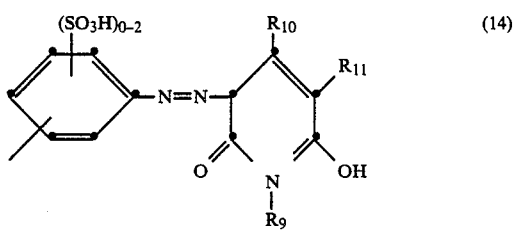

in which $R_9$ and $R_{10}$ are independently of each other hydrogen, $C_{1-4}$alkyl or phenyl and $R_{11}$ is hydrogen, cyano, carbamoyl or sulfomethyl;

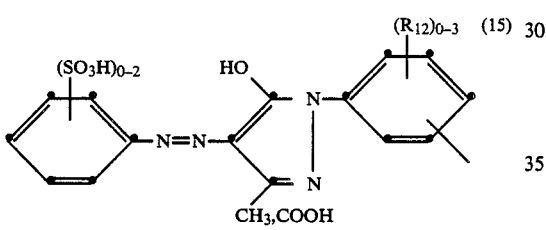

in which $R_{12}$ is 0 to 3 substituents from the group consisting of $C_{1-4}$-alkyl, $C_{1-4}$alkoxy, halogen, carboxyl and sulfo;

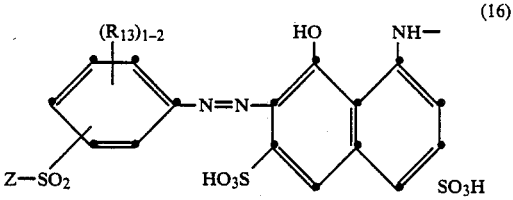

in which $R_{13}$ is 1 or 2 substituents from the group consisting of hydrogen, $C_{1-4}$alkyl, $C_{1-4}$alkoxy, halogen, carboxyl and sulfo, and Z is β-sulfatoethyl, β-thiosulfatoethyl, β-phosphatoethyl, β-acyloxyethyl, β-haloethyl or vinyl;

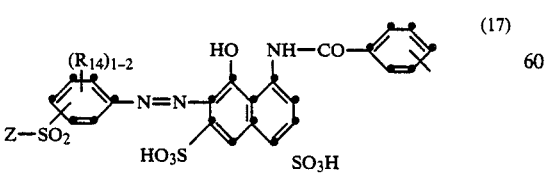

in which $R_{14}$ is 1 or 2 substituents from the group consisting of hydrogen, $C_{1-4}$alkyl, $C_{1-4}$alkoxy, halogen, carboxyl and sulfo, and Z is β-sulfatoethyl, β-thiosulfatoethyl, β-phosphatoethyl, β-acyloxyethyl, β-haloethyl or vinyl.

Preference is further given to reactive dyes according to (e) in which R is a radical of the formula

  (18a)

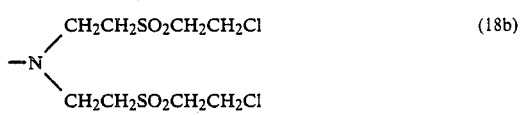  (18b)

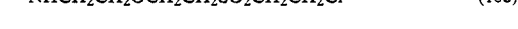  (18c)

—NHCH$_2$CH$_2$OCH$_2$CH$_2$SO$_2$CH$_2$CH$_2$Cl

—NHCH$_2$CH$_2$SO$_2$CH=CH$_2$  (18d)

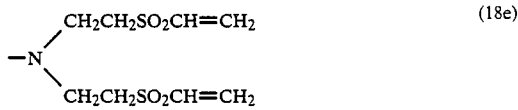  (18e)

—NHCH$_2$CH$_2$OCH$_2$CH$_2$SO$_2$CH=CH$_2$  (18f)

—NHCH$_2$CH$_2$NHCH$_2$CH$_2$SO$_2$CH=CH$_2$  (18g)

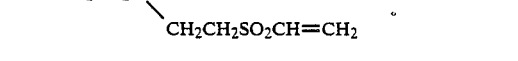  (18h)

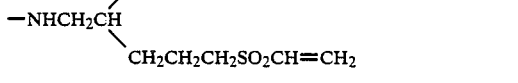  (18i)

Preference is also given to heavy metal complexes of reactive dyes of the formula (1); suitable complexing heavy metals are in particular copper, nickel, cobalt or chromium.

Preference is given in particular to reactive dyes of the formula (1) in which Z is a β-sulfatoethyl, β-chloroethyl or vinyl group, or in which X and Y are fluorine or chlorine. Also suitable in particular are combinations of features according to the preceding description, if applicable.

Reactive dyes of the formula (1) are obtained by reacting an organic dye of the formula

  (19)

or

  (20)

or a dye precursor, one equivalent each of an s-triazine of the formula

  (21)

or

-continued

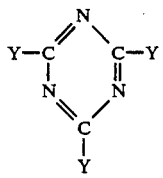

and one equivalent of a diamine of the formula

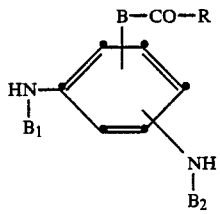

with one another in any desired order, D, D', R', R'', X, Y, B₁, B₂, B and R being as defined under the formula (1), or, if dye precursors are used, converting the intermediate obtained into the desired monohalotriazine dye and, if desired, following up with a further conversion reaction.

If desired, the process according to the invention can be followed by a further conversion reaction. The preparation of the end dyes from precursors comprises in particular couplings which lead to azo dyes.

Since the individual process steps mentioned above can be carried out in various orders, if desired in some instances even simultaneously, different process variants are possible. In general, the reaction is carried out in successive steps, the order of the elementary reactions between the individual reaction components advantageously depending on the particular conditions.

An important process comprises first condensing a dye of the formula

with an s-triazine of the formula

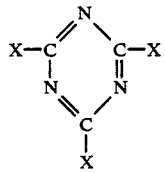

and then condensing the compound obtained of the formula

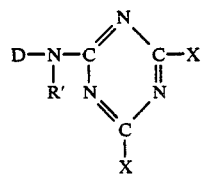

with a diamine of the formula

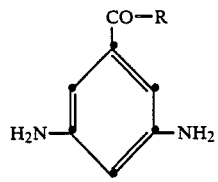

in a molar ratio of 2:1.

In a modified process, reactive dyes of the formula (1) can be prepared by reacting a component of this dye which contains a radical of the formula

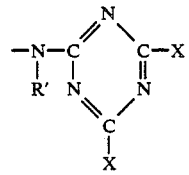

in which R' and X are as defined above, with a second component required for preparing the dye, which can, if desired, contain a radical of the formula (26), and condensing the resulting dye of the formula

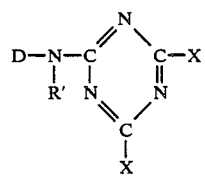

with a diamine of the formula (25), in a molar ratio of 2:1.

Effectively, it depends on the structure of the starting materials which of the possible process variants produce the best results or under which specific conditions, for example at which condensation temperature, the reaction should best be carried out.

Since under certain preconditions hydrolysis of the halotriazine radical occurs, it is necessary to hydrolyze an acetylamino-containing intermediate, to remove the acetyl groups, before condensation with a halotriazine. Which reaction is advantageously carried out first, for example in the preparation of a secondary condensation product of a compound of the formula (23), the triazine of the formula (21) and the organic dye of the formula (19) or a precursor, that of the triazine with the compound of the formula (23) or that with the organic dye or a precursor of the dye, will vary from case to case and will depend in particular on the solubility of the amino compounds involved and on the basicity of the amino groups to be acylated.

A modified embodiment of the process comprises first preparing a dye which contains a preliminary stage of the reactive radical and subsequently converting this preliminary stage into the final stage, for example by esterification or an addition reaction. For example, a dye in which Z is an HO—CH₂CH₂— radical can be prepared and, before or after the acylation, the intermediate can be reacted with sulfuric acid, so that the hydroxyl group is converted into the sulfato group; or an analogous dye is used in which Z is an H₂C=CH— group and thiosulfuric acid is added onto the intermediate to form an HO₃SS—CH₂CH₂— radical. The sulfation of the hydroxyl group in a dye of the formula (1) or in a suitable precursor is effected for example by reaction with concentrated sulfuric acid at 0° C. to moderately elevated temperature. The sulfation can also be effected by reaction of the hydroxy compound with two equivalents of chlorosulfonic acid per hydroxyl group in a polar organic solvent, for example N-methylpyrrolidone, at 10° to 80° C. Preferably, the sulfation is effected by introducing the compound in question into sulfuric acid monohydrate at temperatures between 5° and 15° C. The introduction of another radical for Z in a compound of the formula (1) or an intermediate in place of a halogen atom or the sulfato group, for example a thiosulfato or phosphato group, is effected in a manner known per se. The preparation via an intermediate of the reactive radical proceeds in many cases uniformly and to completion.

In addition, the synthesis can be followed by elimination reactions. For example, reactive dyes of the formula (1) which contain sulfatoethylsulfonyl radicals can be treated with hydrogen halide eliminators, such as sodium hydroxide, and the sulfatoethylsulfonyl radicals become converted into vinylsulfonyl radicals.

It may also be possible to use a process variant where the starting materials are dye precursors. This variant is suitable for preparing reactive dyes of the formula (1) in which D is the radical of a dye composed of two or more than two components, for example a monoazo, disazo, trisazo, metal complex azo, formazan or azomethine dye.

Generally, the reactive dyes of the formula (1) of all dye classes can be prepared in a manner known per se or analogously to known methods by starting from precursors of or intermediates for dyes which contain fibre-reactive radicals according to formula (1) or by introducing these fibre-reactive radicals into intermediates of dye character which are suitable for this purpose.

Preference is given to reactive dyes of the formula (1) in which is the radical of a monoazo or disazo dye or of a metal complex azo dye. In this case, the middle portion of the formula (1) is bonded to a diazo component or coupling component of D or D', as shown above in the formulae (3a) and (3b).

If the starting materials are dye precursors, the reactive dyes of the formula (1) are obtained by condensing a component of the dye of the formula (19) containing an —N(R')H group and a triazine of the formula (21), condensing beforehand or afterwards with a compound of the formula (23), and reacting with the other component of the dye of the formula (19). The same applies mutatis mutandis to the dye of the formula (20) and the triazine of the formula (22). In the preparation of the preferred azo dyes, the diazo components and the coupling components together need to contain at least one amino group —N(R')H and —N(R'')H and can contain further amino groups. In this case the diazo components used are in particular 1,3-phenylenediamine-4-sulfonic acid, 1,4-phenylenediamine-2-sulfonic acid, 1,4-phenylenediamine-2,5-disulfonic acid and 1,3-phenylenediamine-4,6-disulfonic acid. If desired, it is possible to use corresponding acetylamino or nitro compounds in which the acetylamino or nitro group is converted into an H$_2$N group, by hydrolysis or reduction respectively, before the condensation with the triazine of the formula (21) or (22).

If groups capable of metal complex formation are present in the reactive dyes prepared, such as hydroxyl, carboxyl, amino or sulfo, the reactive dyes can subsequently also be metallized. For example, metal complex azo dyes are obtained by treating azo compounds which have been obtained according to the invention and which contain complexing groups, for example hydroxyl or carboxy groups, in the ortho-ortho'-position relative to the azo bridge, with heavy metal donor agents before or if desired even after the condensation with a triazine of the formula (21) or (22). Of particular interest are copper complexes of reactive dyes of the formula (1). In addition to the method of metallization mentioned above, other suitable methods are dealkylating metallization and, for the preparation of copper complexes, oxidative coppering.

The most important process variants are illustrated in the working examples.

In what follows, possible starting materials which can be used for preparing the reactive dyes of the formula (1) will be mentioned individually.

ORGANIC DYES OF THE FORMULA (19) OR (20)

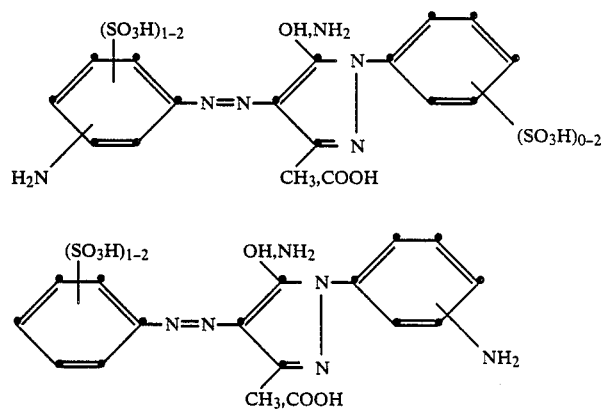

-continued
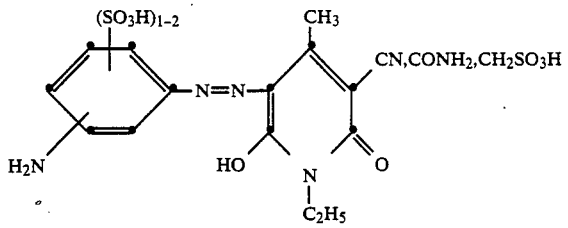
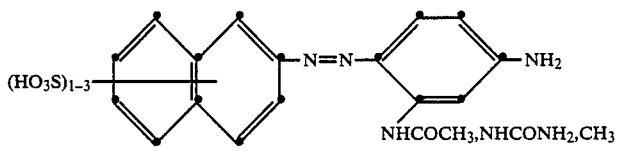
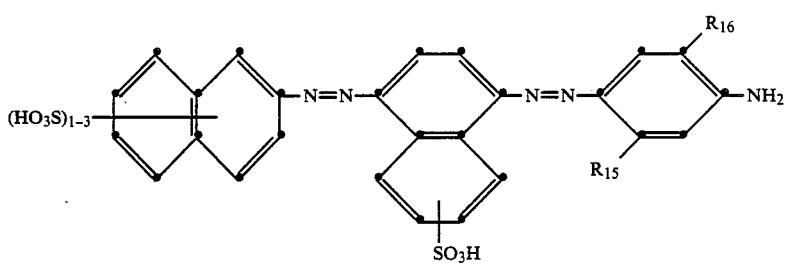
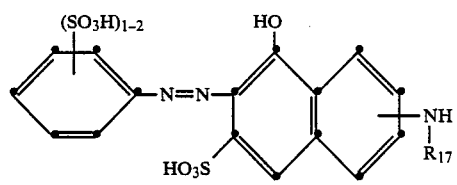
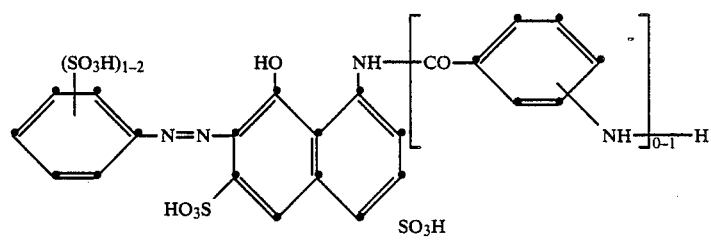
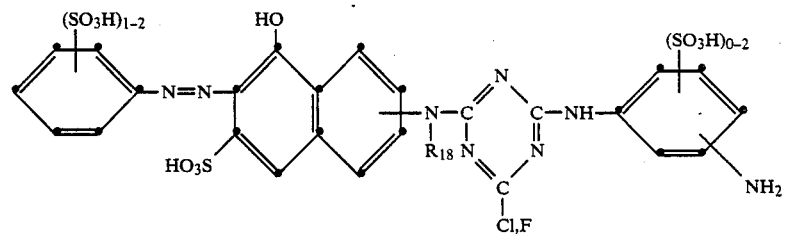
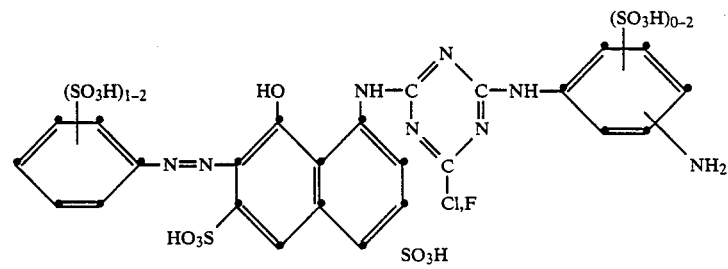

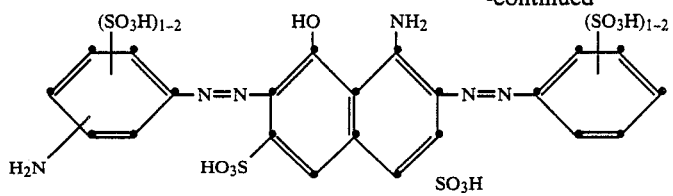
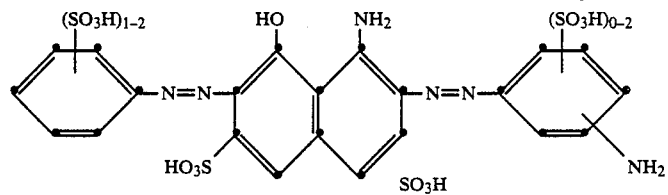
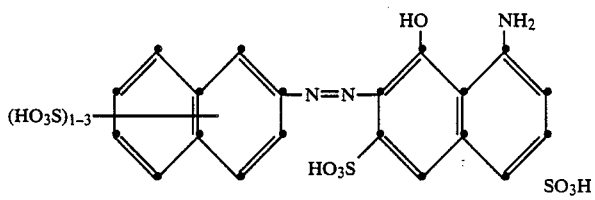
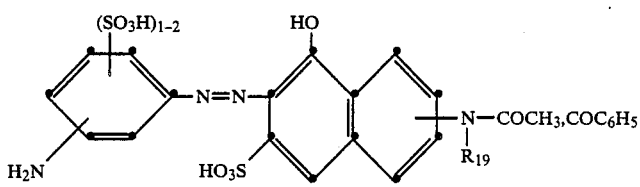
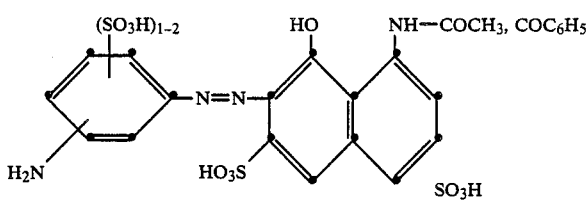
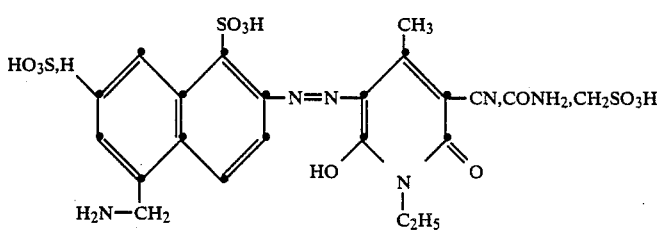
Metal complexes of dyes of the formulae:
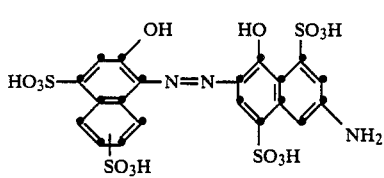
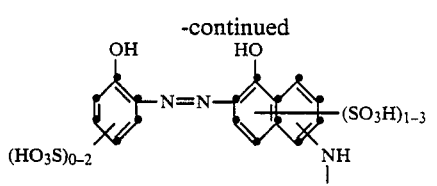
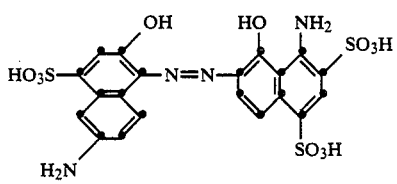
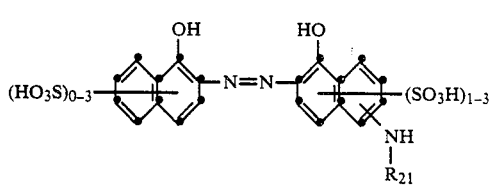

-continued

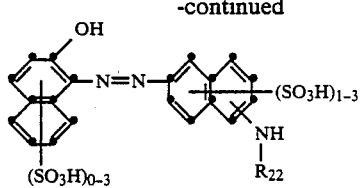

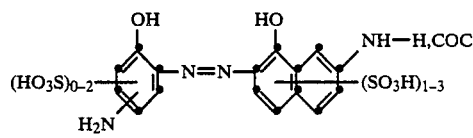

Preferred metal atoms are Cu (1:1 complex) or Cr and Co (1:2 complex). Cr- and Co-complexes can contain the azo compound of the abovementioned formula once or twice, i.e. they can be constructed symmetrically or, using any other desired ligands, asymmetrically.

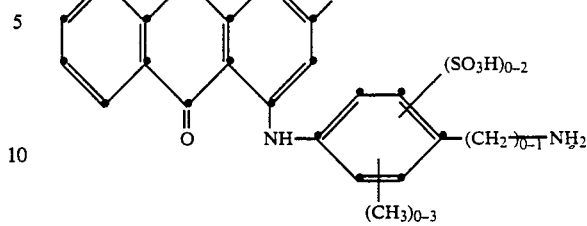

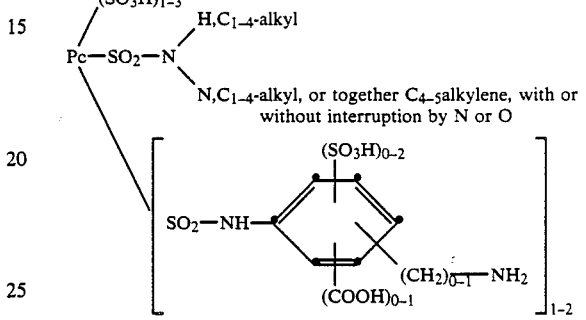

In this formula, Pc is the Cu- or Ni-phthalocyanine radical, the total number of substituents on the Pc structure being 4.

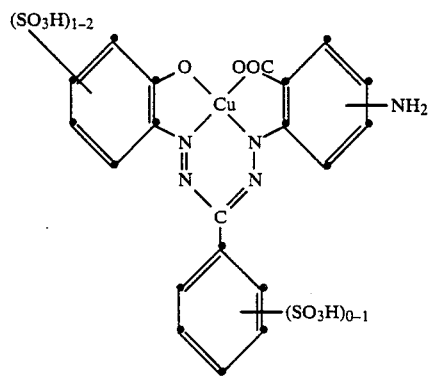

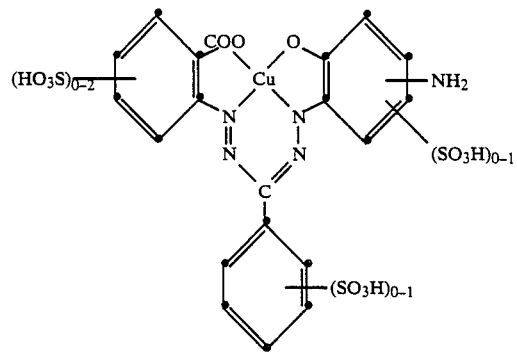

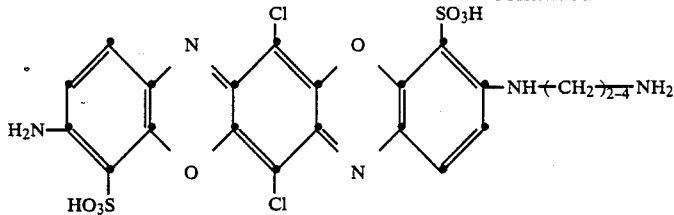

In the formulae shown above, the radicals $R_{17}$ to $R_{23}$ and $R_{30}$ to $R_{33}$ are hydrogen or $C_{1-4}$alkyl, and the radicals $R_{15}$, $R_{16}$ and $R_{24}$ to $R_{29}$ are hydrogen, $C_{1-4}$alkyl, $C_{1-4}$alkoxy, $C_{1-4}$alkanoylamino, ureido or halogen, radicals $R_{15}$, $R_{16}$, . . . etc. which belong to one and the same formula being independent of one another. Preferably, radicals $R_{17}$ to $R_{23}$ and $R_{30}$ to $R_{33}$ are hydrogen, methyl or ethyl, and the radicals $R_{15}$, $R_{16}$, and $R_{24}$ to $R_{29}$ are hydrogen, methyl, ethyl, methoxy, ethoxy, acetylamino, ureido or chlorine. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine; the same is true of the anthraquinones, dioxazines and the like. Preferably, the benzene rings are not further substituted.

Specific diazo and coupling components are:

DIAZO COMPONENTS

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-amino-biphenyl, 1-aminobenzene-2-, -3- or -4-carboxylic acid, 2-amino-diphenylether, 1-aminobenzene-2- or -3- or -4-sulfonamide, -N-methylamide, -N-ethylamide, -N,N-dimethylamide or -N,N-diethylamide, dehydrothio-p-toluidine-sulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not a diamine but an aminoacetylamino compound from which the acetyl group is subsequently eliminated again by hydrolysis, as is mentioned above in the explanations of the process variants, the possibilities are the monoacetyl compounds of the abovementioned diazo components, for example 1-acetylamino-3-aminobenzene-4-sulfonic acid or 1-acetylamino-4-aminobenzene-3-sulfonic acid.

COUPLING COMPONENTS

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(4',8'-disulfo-2'-naphthyl)-3-methyl-5-pyrazolone, 1-(5',7'-disulfo-2'-naphthyl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinolone, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfo-benzylaminobenzene, 1-amino-3-sulfo-benzylamino-4-chlorobenzene, 1-amino-3-N,N-disulfobenzylaminobenzene.

TRIAZINES OF THE FORMULA (21) OR (22)

2,4,6-Trifluoro-s-triazine (cyanuric fluoride), 2,4,6-trichloro-s-triazine (cyanuric chloride), 2,4,6-tribromo-s-triazine (cyanuric bromide), 2,4,6-trisulfo-s-triazine, 2,4,6-tris-methylsulfonyl-s-triazine, 2,4,6-tris-phenylsulfonyl-s-triazine.

DIAMINES OF THE FORMULA (23)

They can be prepared by condensing corresponding dinitrocarbonyl chlorides with amines of the formula

H—R    (27)

which correspond to the radicals of the formulae (1a) to (1d), and reducing the nitro group to an amino group.

The reaction is preferably carried out in a high-boiling organic solvent, for example nitrobenzene. The reduction of the nitro group to an amino group is effected in a manner known per se by catalytic hydrogenation with Pd/carbon in ethanol, ethyl acetate or tetrahydrofuran at room temperature to about 40° C. The reduction can also be carried out with Fe/hydrochloric acid or Fe/acetic acid in aqueous solution.

According to another method, described in DE Offenlegungsschrift 2,040,620, the acid chloride can be reacted with an unsaturated aliphatic amine, and 2-mercaptoethanol can be added onto the double bond of the acid amide with the aid of catalytic amounts of a free radical former or sulfur at temperatures between 50° C. and 180° C. The hydroxyethyl thioether compounds obtained as a result can also be prepared by condensing the acid chloride with a haloalkylamine and heating the condensation product in alcohol with 2-mercaptoethanol and sodium alkoxide. The thioether compounds are then oxidized to the corresponding sulfones.

The oxidation of the thioether compounds to sulfones can be carried out by various methods, for example with hydrogen peroxide with or without tungsten or vanadium compounds as catalysts, and also with peracetic acid, potassium permanganate or chromic acid, or with chlorine/hydrochloric acid, in each case in an aqueous, aqueous-organic or organic medium.

The carboxamides thus obtainable, where the grouping —$SO_2$—Z is a β-hydroxyethylsulfonyl group, can be converted, by treatment with sulfating agents, phosphorylating agents, halogenating agents, alkylsulfonic or arylsulfonic acid halides, alkylcarboxylic or arylcarboxylic acid halides or alkylcarboxylic or arylcarboxylic anhydrides, into the corresponding dye precursors where the grouping —$SO_2$—Z is for example an —$SO_2$—$CH_2$—$CH_2$—O—$SO_3H$, —$SO_2$—$CH_2$—$CH_2$—O—$PO_3H_2$, —$SO_2$—$CH_2$—$CH_2$—halogen, —$SO_2$—$CH_2$—$CH_2$—O—CO—$CH_3$ or —$SO_2$—$CH_2$—$CH_2$—O—CO—$C_6H_5$ grouping. The products thus obtained can be in turn be converted by treatment with alkaline agents, for example alkali metal hydroxide or alkali metal carbonate, such as sodium hydroxide or sodium carbonate, into corresponding compounds where the grouping —$SO_2$—Z is a —$SO_2$—CH=$CH_2$ grouping. The products thus obtained can again be converted by reaction (addition) with salts of thiosulfuric acid, such as sodium thiosulfate, into compounds in which the grouping —$SO_2$—Z is an —$SO_2$—$CH_2$—$CH_2$—S—$SO_3H$ grouping.

Suitable sulfating agents are here for example concentrated sulfuric acid and also chlorosulfonic acid and amidosulfuric acid or other sulfur trioxide donor compounds. Suitable phosphorylating agents are here for example concentrated phosphoric acid, pyrophosphoric acid, metaphosphoric acid, polyphosphoric acid, alkyl polyphosphates, phosphorus oxychloride or mixtures of phosphoric acid and phosphorus(V) oxide. Suitable halogenating agents are for example thionyl chloride and thionyl bromide.

Preference is given to compounds of the formula

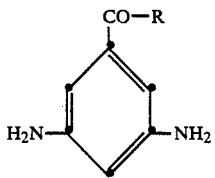

in which R is a radical of the formula $$Z-SO_2-CH_2-(alk)-\underset{V}{\overset{T}{N}}- \quad (1a)$$

$$Z-SO_2-(CH_2)_{\overline{m}}-O-(CH_2)_{\overline{p}}-\underset{R_1}{N}- \quad (1b)$$

$$Z-SO_2-(alk')-NH-(alk')-\underset{H}{N}- \quad (1c)$$

or

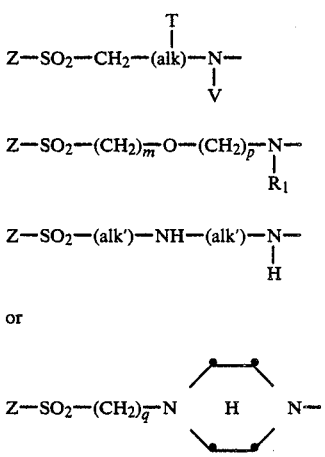

and Z, alk, T, V, $R_1$, alk', m, p and q are as defined under the formula (1).

The preferred process for preparing the compounds of the formula (28) comprises condensing a compound of the formula

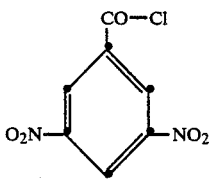

with an amine of the formula $$Z-SO_2-CH_2-(alk)-\underset{V}{\overset{T}{NH}} \quad (30a)$$

$$Z-SO_2-(CH_2)_{\overline{m}}-O-(CH_2)_{\overline{p}}-\underset{R_1}{NH} \quad (30b)$$

$$Z-SO_2-(alk')-NH-(alk')-NH_2 \quad (30c)$$

or

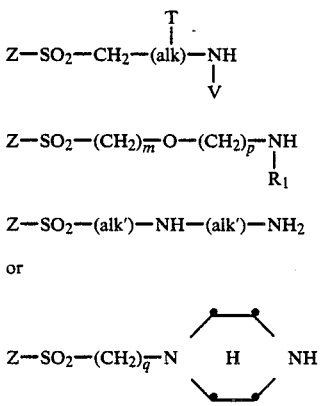

and reducing the nitro group to an amino group.

In a modified version of the process described above, compounds of the formula (28) can also be prepared by condensing a compound of the formula (29) with an amine of the formula

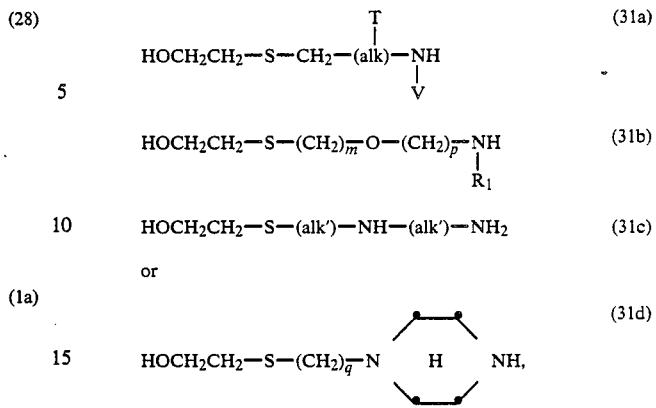

oxidizing the condensation product with elemental chlorine to the corresponding β-chloroethylsulfonyl compound, and reducing the nitro group to an amino group.

In another possible process variant, first a compound of the formula (29) is condensed with one of the amines of formulae (31a) to (31d), the product obtained is oxidized with a peroxide to a sulfone, the nitro group is then reduced to an amino group, the amino compound obtained is condensed with an s-triazine of the formula (21) or (22) or a compound of the formula (23) and finally the hydroxyl group in the radical of one of the amines of the formulae (31a) to (31d) is sulfated.

The condensation of the compound of the formula (29) with the amines of the formulae (31a) to (31d) is carried out for example in chloroform at room temperature and in the presence of alkaline, acid-binding agents, for example alkali metal hydroxides, alkali metal carbonates or alkali metal bicarbonates. The condensation product is then oxidized with a chlorine/hydrochloric acid mixture in a manner known per se. The reduction of the nitro group to an amino group is carried out as described above.

The amines of the formulae (30a) to (31d) used as starting compounds can be prepared analogously to the method of Example 1 of DE Offenlegungsschrift 2,614,550.

AMINES OF THE FORMULA (27)

β-(β'-Chloroethylsulfonyl)ethylamine,
β-[β'-(β''-Chloroethylsulfonyl)ethyloxy]ethylamine,
γ-(β'-Chloroethylsulfonyl)propylamine,
Bis[β'-(β'-chloroethylsulfonyl)ethyl]amine,
Bis[γ'-(β'-chloroethylsulfonyl)propyl]amine,
β-(Vinylsulfonyl)ethylamine,
Bis[β-(vinylsulfonyl)ethyl]amine,
δ-(β'-Chloroethylsulfonyl)butylamine,
β-(β'-Sulfatoethylsulfonyl)ethylamine,
Bis[β-(β'-Sulfatoethylsulfonyl)ethyl]amine
N-(γ-Vinylsulfonylpropyl)piperazine,
β-(β'-Vinylsulfonylethylamino)ethylamine,
N-(β-Vinylsulfonylethyl)piperazine,
β-(β'-Vinylsulfonylethyloxy)ethylamine,
β-[β'-(β''-chloroethylsulfonyl)ethylamino]ethylamine
β-[β'-(β''-Sulfatoethylsulfonyl)-α'-methylethylamino]ethylamine,
β-[β'-(β''-Sulfatoethylsulfonyl)-α'-methylethylamino]-β-methylethylamine,
γ-[β'-(β''-Sulfatoethylsulfonyl)-α'-methylethylamino]propylamine, δ-[β'-(β''-Sulfatoethylsulfonyl)-α'-methylethylamino]-n-butylamine,
α-Carboxyl-β-(β'-chloroethylsulfonyl)ethylamine,
α-Ethoxycarbonyl-β-(β'-chloroethylsulfonyl)ethylamine,
β-Hydroxy-γ-(β'-chloroethylsulfonyl)propylamine,
β,γ-(Bis-β'-chloroethylsulfonyl)propylamine,
β-Acetoxy-γ-(β'-acetoxyethylsulfonyl)propylamine,
β-Chloro-γ(β'-chloroethylsulfonyl)propylamine,
β-Sulfato-γ-(β'-sulfatoethylsulfonyl)propylamine,
Bis[β-hydroxy-γ-(β'-chloroethylsulfonyl)propyl]amine,
Bis[β-chloro-γ-(β'-chloroethylsulfonyl)propyl]amine,
Bis[β-sulfato-γ-(β'-sulfatoethylsulfonyl)propyl]amine,
β-Hydroxy-γ-(β'-vinylsulfonyl)propylamine,
4-(β-Chloroethylsulfonyl)cyclohexylamine,
4-(β-Sulfatoethylsulfonyl)cyclohexylamine,
4-Vinylsulfonylpiperidine,
4-(β-Chloroethylsulfonyl)piperidine,
2-[β-(β'-Chloroethylsulfonyl)ethyl]piperidine,
2-(β-Sulfatoethylsulfonyl)methylpiperidine,
N-[γ-(β'-Chloroethylsulfonyl)propyl]piperazine,
γ-[γ'-(β''-Chloroethylsulfonyl)propyloxy]propylamine,
β-[Bis(β'-vinylsulfonylethyl)amino]ethylamine,
(β,ε-Bisvinylsulfonyl)-n-pentylamine
and also any further compounds in which the β-chloroethylsulfonyl group has been replaced by β-sulfatoethylsulfonyl or vinylsulfonyl or in which the β-chloroethylsulfonyl, β-sulfatoethylsulfonyl or vinylsulfonyl group has been replaced by β-hydroxyethyl.

The condensation of the s-triazine of the formula (21) or (22) in particular of a 2,4,6-trihalo-s-triazine, with the organic dyes of the formulae (19) and (20) or with the diazotizable and/or couplable components containing an —N(R')H or —N(R'')H group is preferably effected in aqueous solution or suspension, at low temperatures, preferably between 0° and 5° C., and at a weakly acidic, neutral or weakly alkaline pH. Advantageously, the hydrogen halide freed in the course of condensation is continuously neutralized by adding aqueous alkali metal hydroxides, alkali metal carbonates or alkali metal bicarbonates. For further reaction of the halotriazine dyes thus obtained, or for the reaction of the 2,4,6-trihalo-s-triazine with the compounds of the formula (23), the free amines or salts thereof, preferably in the form of the hydrochloride, are used. The reaction is carried out at temperatures between about 0° and 40° C., preferably between 5° and 25° C., in the presence of acid-binding agents, preferably sodium carbonate, within a pH range from 2 to 8, preferably 5 to 6.5.

The condensation of the halotriazine with a compound of the formula (23) can be carried out before or after the condensation of the halotriazine with a dye of the formula (19) or (20). The condensation of the halotriazine with a compound of the formula (23) is preferably carried out in aqueous solution or suspension, at low temperature and at weakly acid or neutral pH. Here, too, the hydrogen halide freed in the course of the condensation is advantageously neutralized by uninterrupted addition of aqueous alkali metal hydroxides, alkali metal carbonates or alkali metal bicarbonates.

The diazotization of the diazo components, or of the intermediates containing a diazotizable amino group, is effected in general by the action of nitrous acid in aqueous mineral acid solution at low temperature. The coupling onto the coupling component takes place at strongly acid, neutral or weakly alkaline pH.

The reactive dyes of the formula (1) are suitable for dyeing and printing a very wide range of materials, such as silk, leather, wool, polyamide fibres and polyurethanes, and in particular cellulose-containing fibre materials of any kind. Such fibre materials are for example the natural cellulose fibres, such as cotton, linen and hemp, and also cellulose pulp and regenerated cellulose. The reactive dyes of the formula (1) are also suitable for dyeing or printing hydroxyl-containing fibres which are present in blend fabrics, for example mixtures of cotton with polyamide fibres or in particular polyester fibres.

The dyes according to the invention can be applied to the fibre material and fixed on the fibre in various ways, in particular in the form of aqueous dye solutions and print pastes. They are suitable not only for the exhaust method of dyeing but also for dyeing by the padding method, whereby the material is impregnated with aqueous, optionally salt-containing dye solutions and the dyes are fixed after an alkali treatment or in the presence of alkali, if desired by heating. After fixing, the dyeings and prints are thoroughly rinsed with cold and hot water, in the presence or absence of an agent which has a dispersing action and promotes the diffusion of the unfixed portions.

If the reactive dyes of the formula (1) in which D is the radical of an anthraquinone dye are insufficiently soluble in the alkaline dyeing liquor, this defect can be remedied in a manner known from the literature, namely by adding dispersants or other non-coloured compounds, for example a naphthalenesulfonic acid/formaldehyde condensate or in particular anthraquinone-2-sulfonic acid.

The reactive dyes of the formula (1) are distinguished by high reactivity and good fixing properties and very good build-up. They can therefore be used for exhaust dyeing at low dyeing temperatures and require only short steaming times in the pad-steam process. The degrees of fixation are high, and the unfixed portions can easily be washed off, the difference between the degree of exhaustion and the degree of fixation being remarkably small, i.e. the soaping loss being very small. The reactive dyes of the formula (1) are also suitable for printing, in particular on cotton, but also for printing nitrogen-containing fibres, for example wool, silk or wool- or silk-containing blend fabrics.

The dyeings and prints prepared with the dyes according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness.

The examples which follow serve to illustrate the invention. The temperatures are given in degrees celsius, and parts and percentages are by weight, unless otherwise stated. Parts by weight relate to partsby volume as the kilogram relates to the litre.

The preparation of the monoazo or disazo intermediate compounds has not been described in all cases in the working examples below, but it will be readily apparent from the general description.

EXAMPLE 1:

46.7 parts of the monoazo dye obtained by coupling diazotized p-aminobenzoic acid onto 1-amino-8-naphthol-3,6-disulfonic acid in an alkaline medium are dissolved in the form of the sodium salt in 600 parts of water and added to an icecold suspension of 18.5 parts of cyanuric chloride. The mixture is stirred at between 0° and 5° and is neutralized by the gradual addition of a dilute sodium hydroxide solution. After the condensation has ended, a solution of 18.5 parts of a compound of the formula

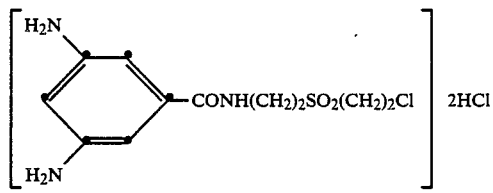

in 100 parts of water is run in, and the mixture is stirred between 30°–40° for an hour, during which the pH is maintained between 5 and 7 by the dropwise addition of sodium hydroxide solution. After the condensation has ended, the pH is adjusted to 8 with sodium carbonate, and the disazo dye is precipitated by the addition of acetone, filtered off and dried.

The disazo dye obtained of the formula

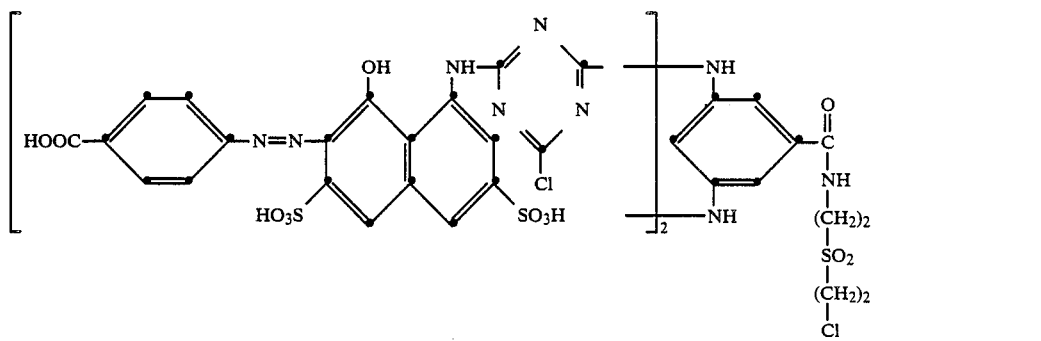

dyes cellulose fibres by the exhaust method in the presence of electrolytes from an alkaline bath in strong, pure bluish red shades.

EXAMPLE 2:

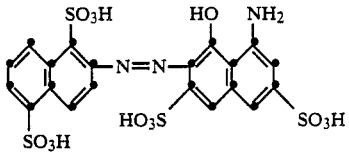

50 parts of 2-normal sodium carbonate solution are then added dropwise and a pH of 6–6.5 is obtained. 23 parts of the compound of the formula

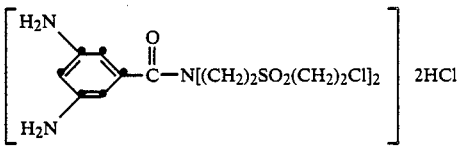

are then added in powder form. The mixture is heated to 40° C. in the course of half an hour and maintained at that temperature for 3 hours. At the same time 100 parts of 2-normal sodium carbonate solution are added dropwise at a pH of 6–6.5. To effect precipitation, 20% of potassium chloride are then added, and the mixture is cooled down with stirring to 20°–25° and filtered. This gives about 235 parts of a dye paste which are dried at 50°–55° in vacuo. The reactive dye prepared has the following structure:

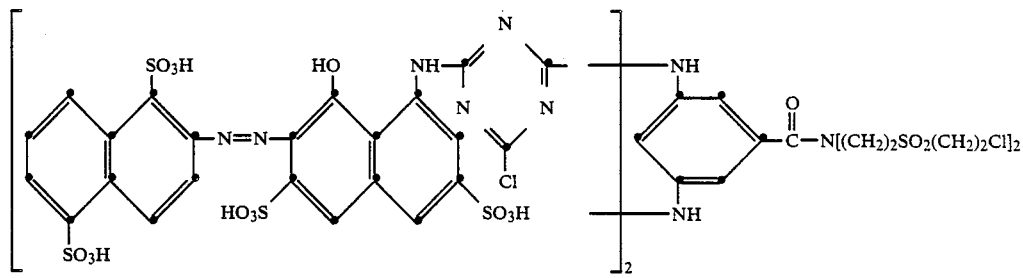

It dyes cellulose fibres by the exhaust method in fast deep red shades.

EXAMPLE 3:

18.5 parts of cyanuric chloride are dissolved in 110 parts of acetone and poured onto 250 parts of ice with vigorous stirring. This solution is then admixed at 0° C. with a solution of 55.3 parts of the dye of the following structure:

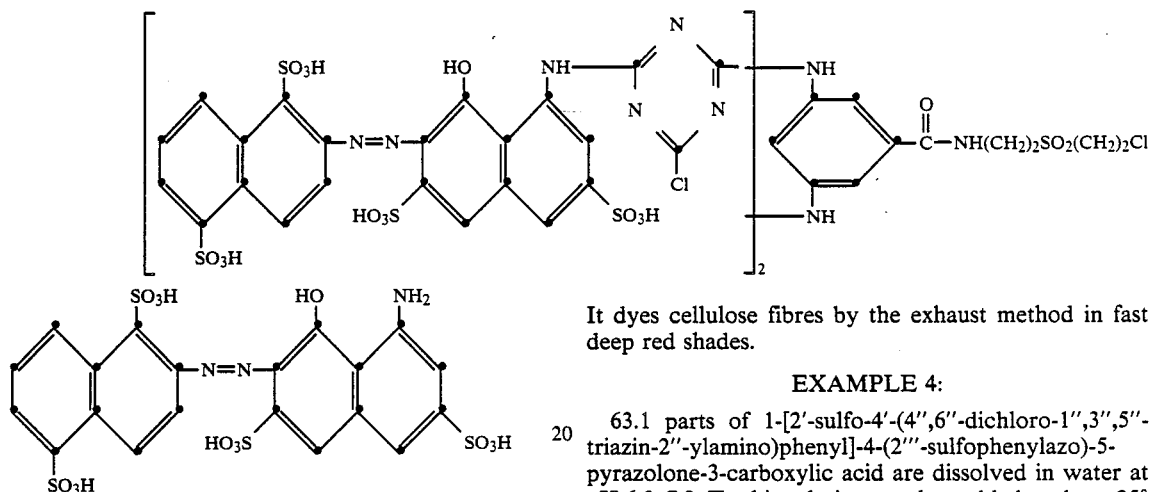

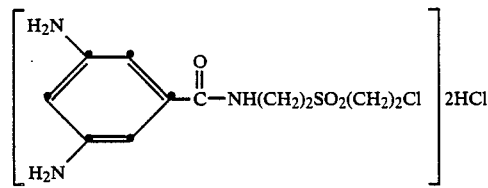

50 parts of 2-normal sodium carbonate solution are then added dropwise and a pH of 6–6.5 is obtained. 18.5 parts of the compound of the formula

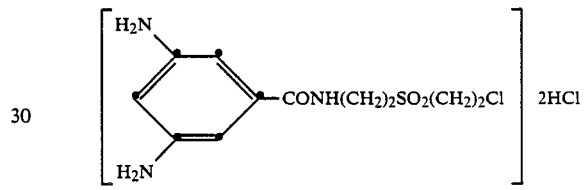

are then added in powder form. The mixture is heated to 40° C. in the course of half an hour and maintained at that temperature for 3 hours. At the same time 100 parts of 2-normal sodium carbonate solution are added dropwise at a pH of 4.0–6.0. To effect precipitation, 20% of potassium chloride are then added, and the mixture is cooled down with stirring to 20°–25° and then filtered. This gives about 235 parts of a dye paste which are dried at 50°–55° in vacuo. The reactive dye prepared has the following structure:

It dyes cellulose fibres by the exhaust method in fast deep red shades.

EXAMPLE 4:

63.1 parts of 1-[2'-sulfo-4'-(4",6"-dichloro-1",3",5"-triazin-2"-ylamino)phenyl]-4-(2'''-sulfophenylazo)-5-pyrazolone-3-carboxylic acid are dissolved in water at pH 6.8–7.2. To this solution are then added at about 25° 18.5 parts of a compound of the formula and the mixture is heated to 35°–40°. The pH starts to fall. When the pH has dropped to about 3.5 it is maintained within a range from 3.5 to 4.5 by the addition of about 11 g of sodium carbonate a little at a time. The reaction ends after about 3 hours, when no further alkali is consumed. The dye solution is then brought to 7.0 by adding disodium hydrogen-phosphate. The dye obtained of the structure:

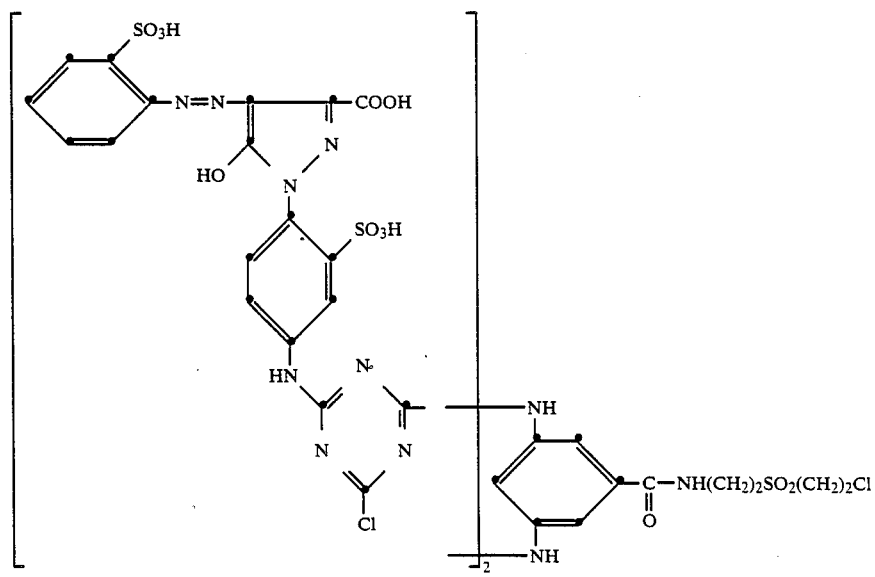

can be isolated by salting out or spray drying. It dyes cellulose fibres in pure greenish yellow shades.

EXAMPLE 5:

54.5 parts of the dye 2-(4'-amino-2'-ureidophenylazo)naphthaline-3,6,8-trisulfonic acid are dissolved in 250 parts of water under neutral conditions. This neutral solution is added to a suspension prepared from 18.5 parts of cyanuric chloride in acetone and water. By cooling with ice the temperature is maintained at 0° to 3°. In the course of the acylation reaction 9 g of bicarbonate are added in such a way that the pH stays between 5.5 and 7. Once starting dye is no longer detectable in a chromatogram, 14 parts of

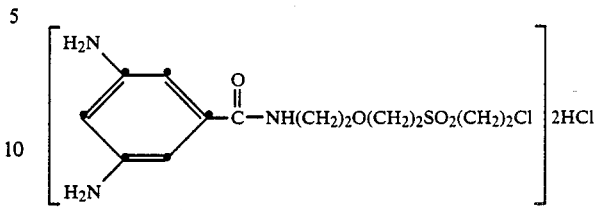

in 100 ml of water the temperature is raised to 20° to 25° C. and the pH is maintained at 5.5–6.5. Reaction time about 4 hours.

To precipitate the dye the neutral solution is admixed with 10% of sodium chloride and 10% of potassium chloride and filtered. The paste obtained is dried at 40° to 50° in vacuo. The reactive dye thus prepared has the following structure:

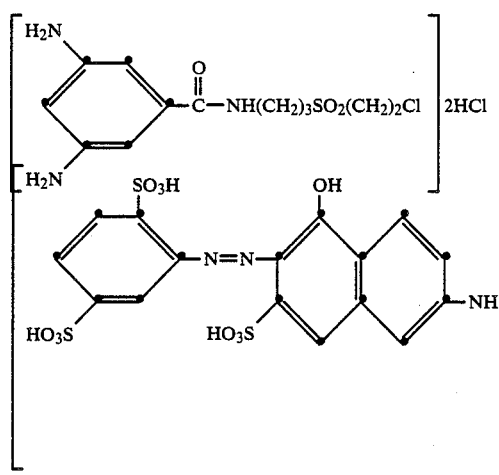

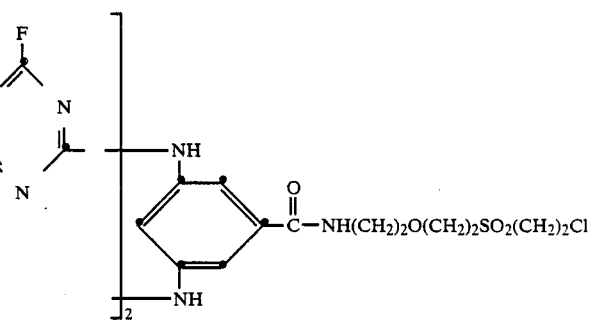

It dyes cellulose fibres by the exhaust method in strong pure orange shades.

EXAMPLE 7:

31.9 parts of 1,8-aminonaphthol-3,6-disulfonic acid are dissolved under neutral conditions by addition of sodium hydroxide, and the solution is added to an ice-cold aqueous suspension of 18.5 parts of cyanuric chloride. The mixture is stirred at between 0° and 5° for 2 in 200 parts of water are added, and the mixture is heated to 30°. By addition of a further 18 g of bicarbonate the pH is maintained within the limits from 6.5 to 7.0. Reaction has ended when no further alkali is consumed. The resulting dye of the formula:

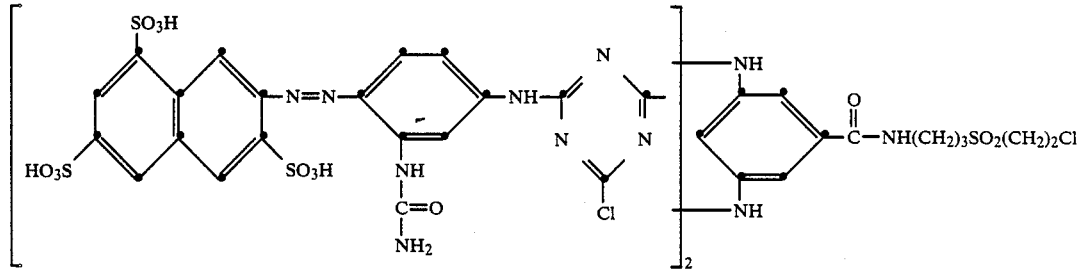

is precipitated by addition of sodium chloride and dried at 50° to 55° in vacuo. It dyes cellulose fibres by the exhaust method in strong pure golden yellow shades.

EXAMPLE 6:

50.3 parts of the dye 2-amino-5-hydroxy-6-(2',5'-disulfophenylazo)naphthalene-7-sulfonic acid are dissolved in 800 ml of water under neutral conditions and the solution is cooled down to 0° to 5°. At this temperature 14 parts of cyanuric fluoride are added, and the pH of the reaction solution is maintained at 6–6.5 by simultaneous addition of 2 N sodium hydroxide solution. After addition of 21.0 parts of a compound of the formula hours and is neutralized with a dilute sodium hydroxide solution in such a way that the reaction always remains weakly acid to Congo red. After the condensation has ended, a diazo solution prepared in a conventional manner from 13.7 parts of orthanilic acid is added. About 50 parts by volume of 2 N sodium hydroxide solution are added dropwise in the course of 1 to 2 hours. After the coupling has ended, a solution of 18.5 parts of the compound of the formula

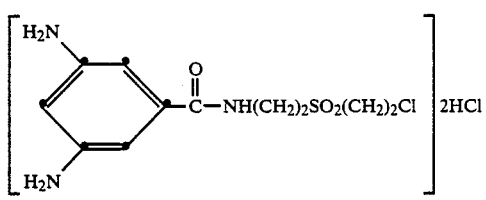

in 100 parts of water is added, the temperature is raised to 35°, and the mixture is maintained at that temperature for 2 hours. The reaction mixture is neutralized by gradual addition of a dilute sodium hydroxide solution. The resulting bis-chlorotriazinylamino dye is salted out, filtered off and dried. The dye can also be precipitated by addition of acetone or alcohol.

The structure is as follows:

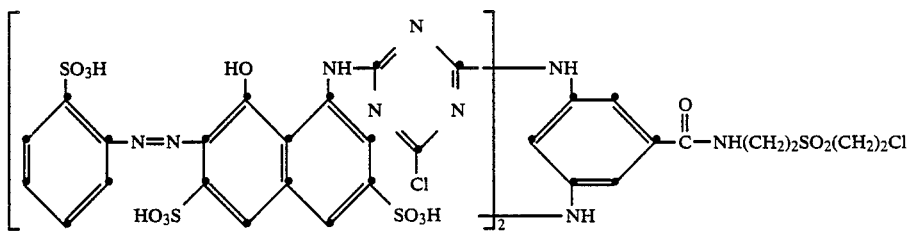

It dyes cellulose fibres in fast pure yellowish red shades.

EXAMPLE 8:

Example 2 is repeated, condensing 31.9 parts of 1,8-aminonaphthol-3,6-disulfonic acid with 18.5 parts of cyanuric chloride. The resulting solution of the primary condensation products is then admixed in the course of 10 minutes with an aqueous solution of 18.5 parts of the compound of the formula

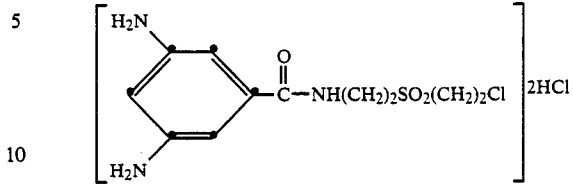

the mixture is gradually brought to 30°, and about 50 parts by volume of 2 N sodium hydroxide solution are added dropwise in the course of 1 hour in such a way that the pH never exceeds 6. After the condensation has ended, a solution of 20 parts of anhydrous sodium carbonate is added, followed at 5°-10° by a diazo solution of 22.4 parts of 4-β-sulfatoethylsulfonylaniline. After the coupling has ended, the dye is precipitated by addition of acetone or alcohol, filtered off and dried.

The disazo dye obtained of the formula

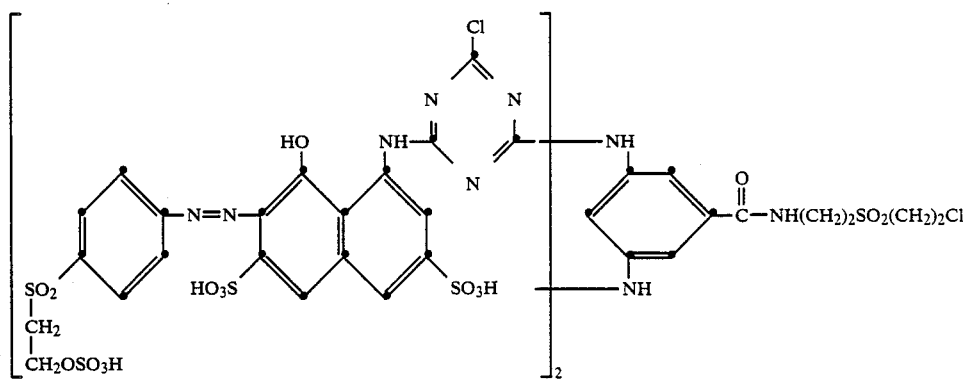

dyes cellulose fibres by the exhaust method in very strong red shades.

The procedures described in Examples 1 to 8 can also be used to prepare the dyes of Nos. 9 to 25 listed in the table below. The dyes dye cellulose fibres in the hues stated in the third column.

| Example No. | Dye | Hue |
|---|---|---|
| 9 | (structure) | Blue |
| 10 | (structure) | Blue |
| 11 | (structure) | Blue |

-continued

| Example No. | Dye | Hue |
|---|---|---|
| 12 | | Blue |
| 13 | | Yellow |
| 14 | | Yellow |

-continued
| Example No. | Dye | Hue |
|---|---|---|
| 15 | 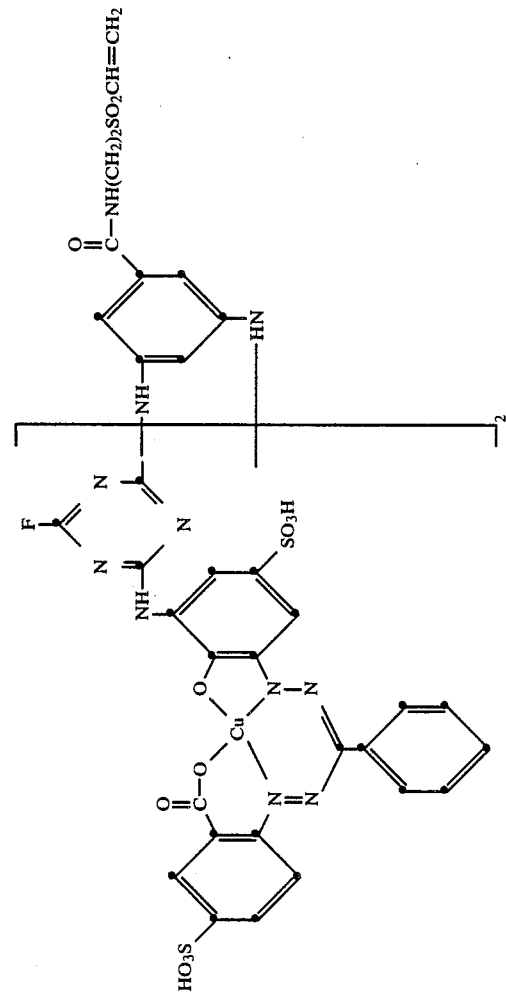 | Blue |
| 16 | 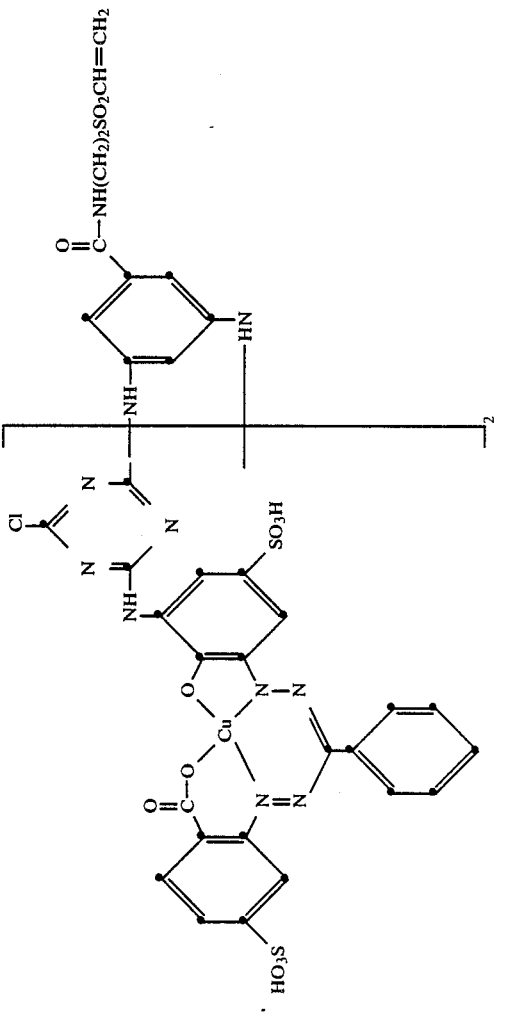 | Blue |

-continued
| Example No. | Dye | Hue |
|---|---|---|
| 17 | 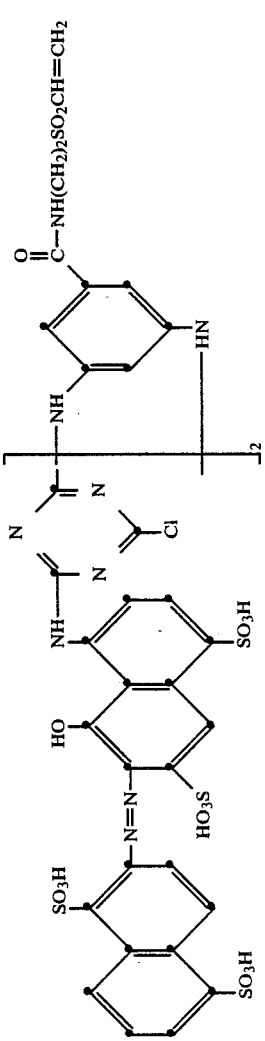 | Red |
| 18 | 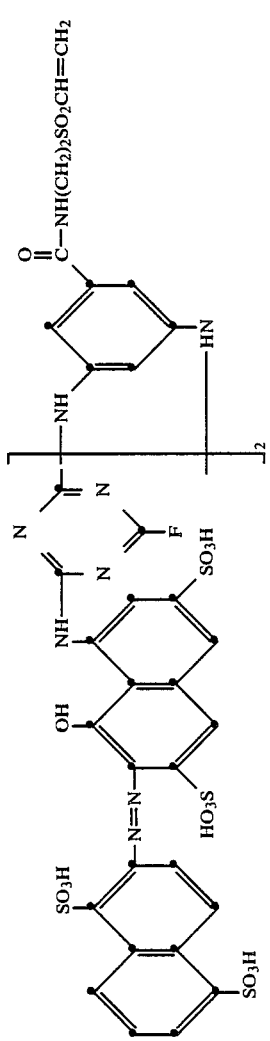 | Red |
| 19 | 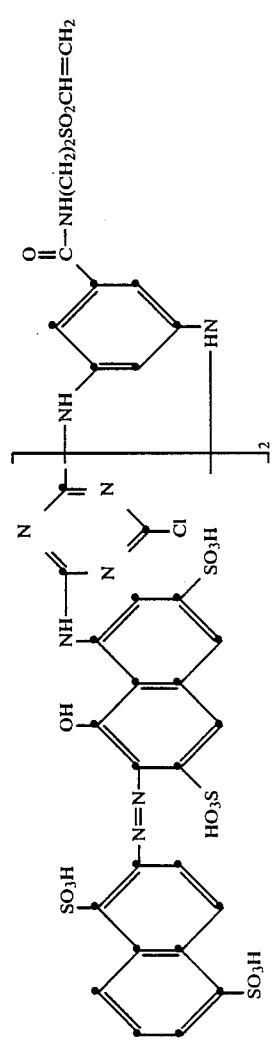 | Red |

-continued

| Example No. | Dye | Hue |
|---|---|---|
| 20 | (structure with naphthalene trisulfonic acid — N=N — phenyl(NHCOCH$_3$) — NH — triazine(Cl) — [NH — phenyl — C(O)NH(CH$_2$)$_2$SO$_2$CH=CH$_2$]$_2$) | Yellow |
| 21 | (structure with naphthalene trisulfonic acid — N=N — phenyl(NHCOCH$_3$) — NH — triazine(F) — [NH — phenyl — C(O)NH(CH$_2$)$_2$SO$_2$CH=CH$_2$]$_2$) | Yellow |
| 22 | (structure: HO$_3$S-phenyl-N=N-naphthalene(NH$_2$, OH, SO$_3$H, HO$_3$S)-N=N-phenyl(SO$_3$H)-NH-triazine(Cl)-[NH-phenyl-C(O)NH(CH$_2$)$_3$SO$_2$CH=CH$_2$]$_2$) | Navy |

| Example No. | Dye | Hue |
|---|---|---|
| 23 | 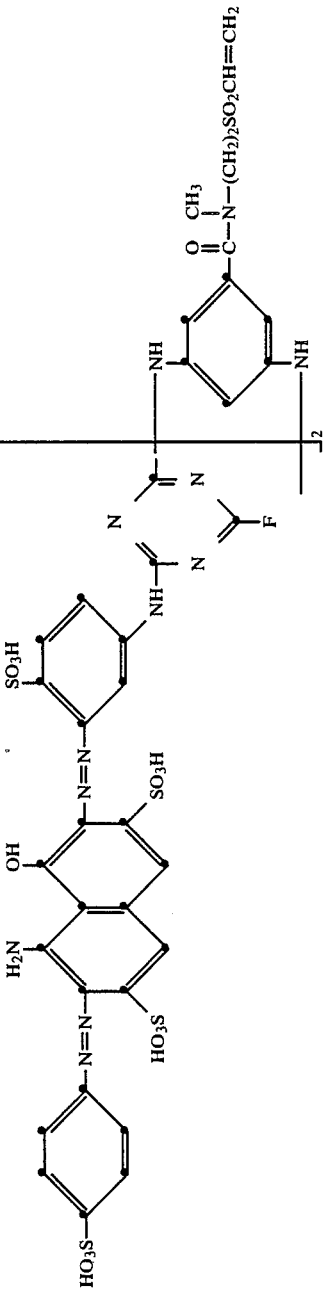 | Navy |
| 24 | 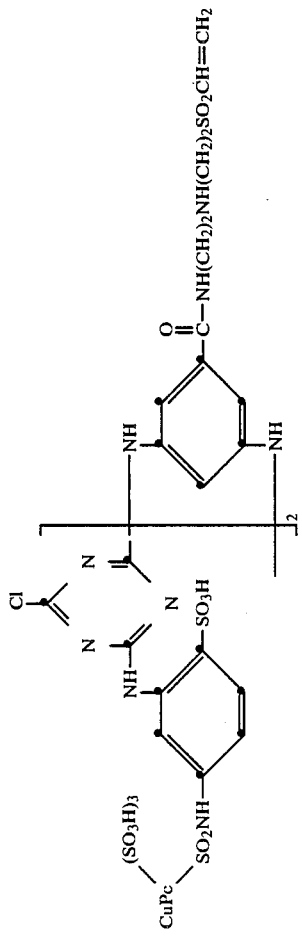 | Turquoise |
| 25 | 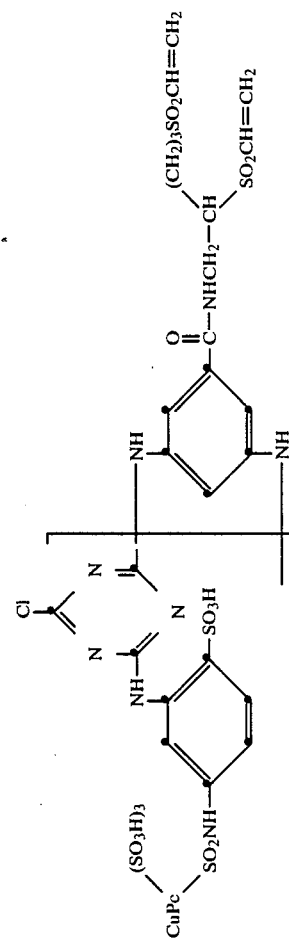 | Turquoise |

DYEING METHOD I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes, 100 parts of a solution which contains per liter 16 g of sodium hydroxide and 20 g of calcined sodium carbonate are added. The temperature of the dye-bath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

DYEING METHOD VII 2 parts of the dye of Example 5, 160 parts of sodium sulfate and, as a buffer, 4 parts of $Na_2HPO_4 \cdot 12H_2O$ and 1 part of $KH_2PO_4$ are added to 2,000 parts of water, so that a dyebath of pH 7 is obtained. This bath is entered with 100 parts of a knitwear material made of non-mercerized cotton. The temperature of the bath is raised to 130° C. in the course of 30 minutes, and dyeing is carried out at that temperature for 60 minutes. The dyed material is then removed from the bath, washed with water, soaped, washed again with water and dried. A deep red dyeing has been obtained.

DYEING METHOD VIII 2 parts of the dye of Example 5, 2 parts of the known water-insoluble anthraquinone dye of the formula

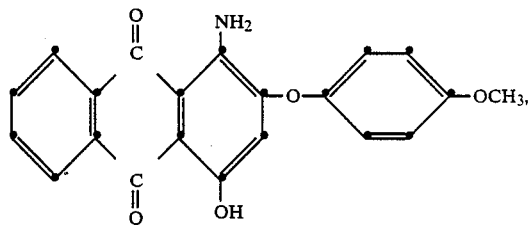

120 parts of sodium sulfate and, as buffer, 4 parts of $Na_2HPO_4 \cdot 12H_2O$ and 1 part of $KH_2PO_4$ are added to 2,000 parts of water. The dyebath thus obtained is then entered with 100 parts of a 50:50 polyester/cotton blend fabric, and in the course of 30 minutes the temperature of the bath is raised to 130° C., and dyeing is carried out at that temperature for 60 minutes. The dyed fabric is then removed from the bath, washed with water, soaped, washed again with water and dried. A level red dyeing has been obtained on the fabric. The dyebath is maintained at pH 7 before and during the dyeing process.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

What is claimed is:

1. A reactive dye of the formula

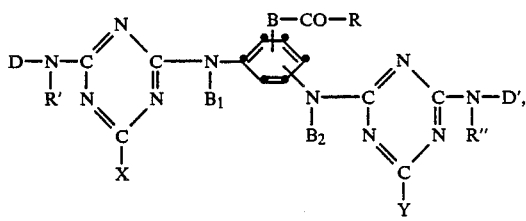

(1)

in which D and D' are each independently of the other a radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, R', R'', $B_1$ and $B_2$ are independently of each other hydrogen or alkyl which has 1 to 4 carbon atoms and which is unsubstituted or substituted by halogen, hydroxyl, cyano, $C_1$–$C_4$-alkoxy, $C_1$–$C_4$-alkoxycarbonyl, carboxyl, sulfamoyl, sulfo or sulfato, X and Y are independently of each other fluorine, chlorine, bromine, sulfo, $C_1$–$C_4$-alkylsulfonyl or phenylsulfonyl, B is a direct bond or a radical —$CH_{2n}$ or —O—$CH_{2n}$, n is 1 to 6; R is a radical of the formula

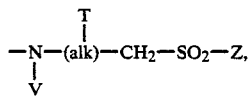

(1a)

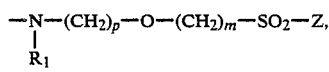

(1b)

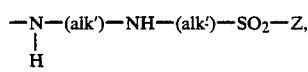

(1c)

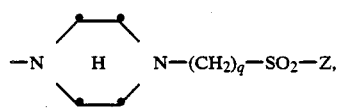

(1d)

Z is β-sulfatoethyl, β-thiosulfatoethyl, β-phosphatoethyl, β-acetoxyethyl, β-haloethyl or vinyl; alk is alkylene having 1 to 6 carbon atoms or a branched isomer thereof; T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or a radical —$SO_2$—Z in which Z is as defined above, V is hydrogen or alkyl which has 1 to 4 carbon atoms and is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfonyl, N,N-dimethylsulfamoyl, N,N-diethylsulfamoyl, methylsulfonyl, ethylsulfonyl, propylsulfonyl, alkoxy groups having 1 or 2 carbon atoms, halogen or hydroxyl, or a radical

(1e)

in which Z, alk and T are as defined above, $R_1$ is hydrogen or $C_1$–$C_6$-alkyl, each alk' is independently of the other one polymethylene having 2 to 6 carbon atoms or a branched isomer thereof, and m is 1 to 6, p is 1 to 6 and q is 1 to 6.

2. A reactive dye according to claim 1, in which the radicals D—N(R')— and D'—N(R'')— are identical.

3. A reactive dye according to claim 2, in which X and Y are identical and are chlorine or fluorine.

4. A reactive dye according to claim 3, in which R' and R'' are hydrogen, methyl or ethyl.

5. A reactive dye according to claim 4, in which $B_1$ and $B_2$ are hydrogen.

6. A reactive dye according to claim 5, of the formula

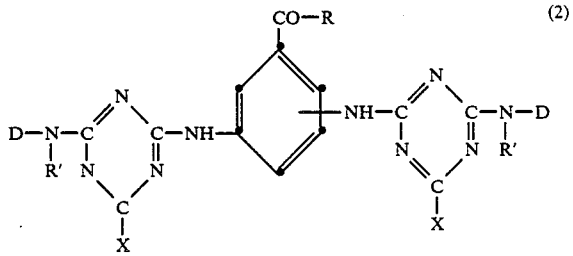

(2)

7. A reactive dye according to claim 6, in which D is the radical of a monoazo or disazo dye.

8. A reactive dye according to claim 6, in which D is the radical of a metal complex azo or formazan dye.

9. A reactive dye according to claim 7, in which D is a monoazo or disazo dye of the formula

(3a)

or

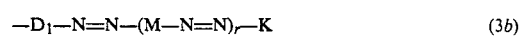

(3b)

or of a metal complex derived therefrom, $D_1$ is a benzene or naphthalene diazo component, M is a benzene or naphthalene middle component, and K is a benzene, naphthalene, pyrazolone, 6-hydroxy-2-pyridone or acetoacetarylamide coupling component, where $D_1$, M and K are unsubstituted or substituted by alkyl having 1 to 4 carbon atoms, alkoxy having 1 to 4 carbon atoms, acetylamino, propionylamino, benzoylamino, amino, alkylamino having 1 to 4 carbon atoms, phenylamino, N,N-di-β-hydroxyethylamino, N,N-di-β-sulfatoethylamino, sulfobenzylamino, N,N-di-sulfobenzylamino, alkoxycarbonyl having 1 to 4 carbon atoms in the alkoxy radical, alkyl-sulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo, s is 0 or 1, and $D_1$, M and K together contain at least two sulfo groups.

10. A reactive dye according to claim 9 in which $D_1$, M and K together contain three or four sulfo groups.

11. A reactive dye according to claim 8, in which D is the radical of a formazan dye of the formula

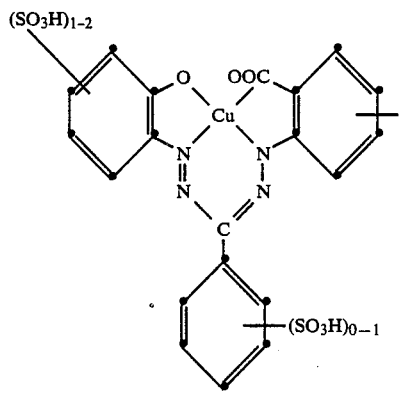

or

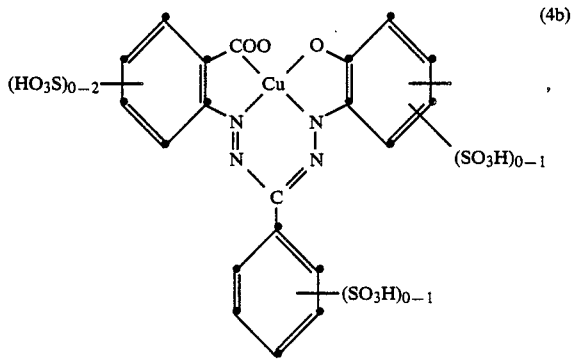

in which the benzene nuclei is unsubstituted further substituted by alkyl having 1 to 4 C atoms, alkoxy having 1 to 4 C atoms, alkylsulfonyl having 1 to 4 C atoms, halogen or carboxyl.

12. A reactive dye according to claim 7, in which D is a radical of the formula

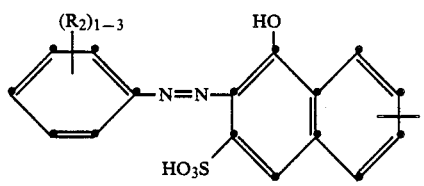

in which $R_2$ is 1 to 3 substituents from the group consisting of $C_{1-4}$-alkyl, $C_{1-4}$alkoxy, halogen, carboxyl and sulfo.

13. A reactive dye according to claim 7, in which D is a radical of the formula

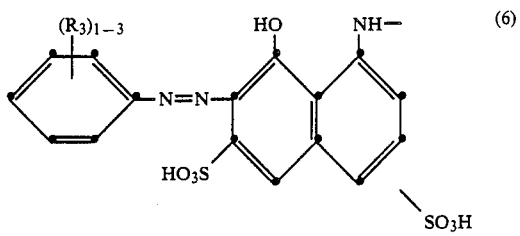

in which $R_3$ is 1 to 3 substituents from the group consisting of $C_{1-4}$-alkyl, $C_{1-4}$alkoxy, halogen, carboxyl and sulfo.

14. A reactive dye according to claim 7, in which D is a radical of the formula

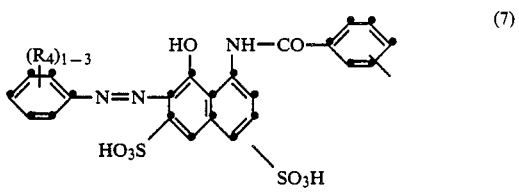

in which $R_4$ is 1 to 3 substituents from the group consisting of $C_{1-4}$-alkyl, $C_{1-4}$alkoxy, halogen, carboxyl and sulfo.

15. A reactive dye according to claim 7, in which D is a radical of the formula

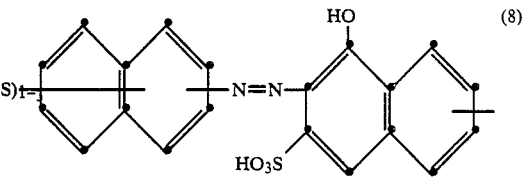

16. A reactive dye according to claim 7, in which D is a radical of the formula

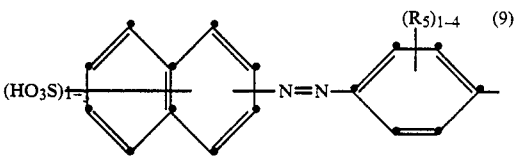

in which $R_5$ is 1 to 4 independently selected substituents from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and sulfo.

17. A reactive dye according to claim 7, in which D is a radical of the formula

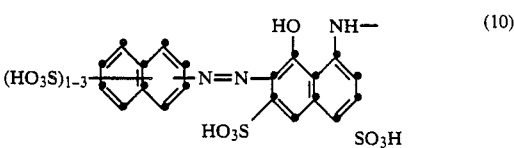

18. A reactive dye according to claim 7, in which D is a radical of the formula

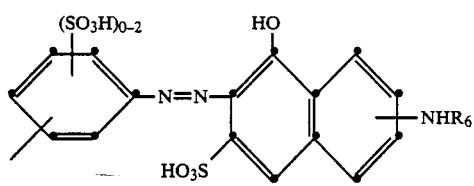

in which $R_6$ is $C_{1-4}$alkanoyl or benzoyl.

19. A reactive dye according to claim 7, in which D is a radical of the formula

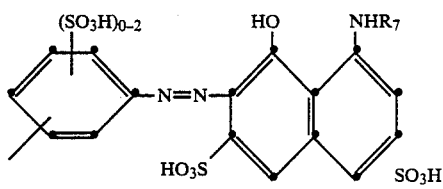

in which $R_7$ is $C_{1-4}$alkanoyl or benzoyl.

20. A reactive dye according to claim 7, in which D is a radical of the formula

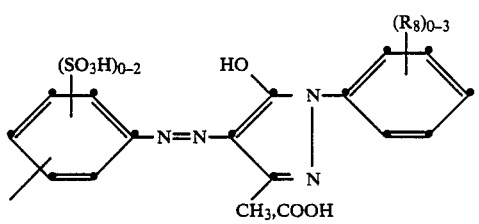

in which $R_8$ is 0 to 3 substituents from the group consisting of $C_{1-4}$-alkyl, $C_{1-4}$alkoxy, halogen, carboxyl and sulfo.

21. A reactive dye according to claim 7, in which D is a radical of the formula

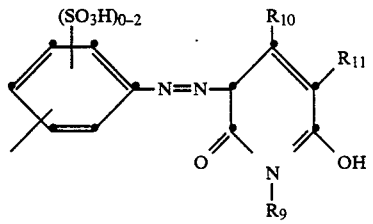

in which $R_9$ and $R_{10}$ are independently of each other hydrogen, $C_{1-4}$alkyl or phenyl, and $R_{11}$ is hydrogen, cyano, carbamoyl or sulfomethyl.

22. A reactive dye according to claim 7, in which D is a radical of the formula

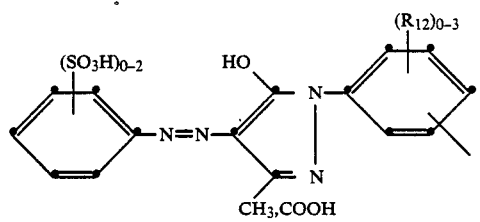

in which $R_{12}$ is 0 to 3 substituents from the group consisting of $C_{1-4}$alkyl, $C_{1-4}$alkoxy, halogen, carboxyl and sulfo.

23. A reactive dye according to claim 7, in which D is a radical of the formula

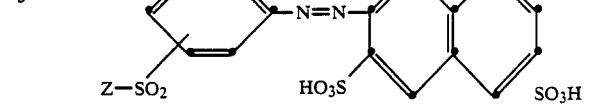

in which $R_{13}$ is 1 or 2 substituents from the group consisting of hydrogen, $C_{1-4}$alkyl, $C_{1-4}$alkoxy, halogen, carboxyl and sulfo, and Z is β-sulfatoethyl, β-thiosulfatoethyl, β-phosphatoethyl, β-acetyloxethyl, β-haloethyl or vinyl.

24. A reactive dye according to claim 7, in which D is a radical of the formula

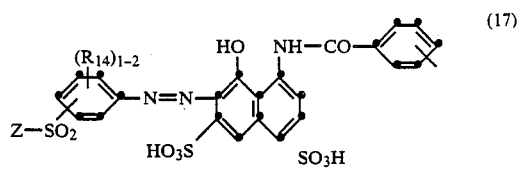

in which $R_{14}$ is 1 or 2 substituents from the group consisting of hydrogen, $C_{1-4}$alkyl, $C_{1-4}$alkoxy, halogen, carboxyl and sulfo, and Z is β-sulfatoethyl, β-thiosulfatoethyl, β-phosphatoethyl, β-acetyloxethyl, β-haloethyl or vinyl.

25. A reactive dye according to claim 6, in which R is a radical of the formula

| | |
|---|---|
| —NHCH$_2$CH$_2$SO$_2$CH$_2$CH$_2$Cl | (18a) |
| —N(CH$_2$CH$_2$SO$_2$CH$_2$CH$_2$Cl)$_2$ | (18b) |
| —NHCH$_2$CH$_2$OCH$_2$CH$_2$SO$_2$CH$_2$CH$_2$Cl | (18c) |
| —NHCH$_2$CH$_2$SO$_2$CH=CH$_2$ | (18d) |
| —N(CH$_2$CH$_2$SO$_2$CH=CH$_2$)$_2$ | (18e) |
| —NHCH$_2$CH$_2$OCH$_2$CH$_2$SO$_2$CH=CH$_2$ | (18f) |
| —NHCH$_2$CH$_2$NHCH$_2$CH$_2$SO$_2$CH=CH$_2$ | (18g) |
| —NHCH$_2$CH$_2$N(CH$_2$CH$_2$SO$_2$CH=CH$_2$)$_2$ | (18h) |
| —NHCH$_2$CH(SO$_2$CH=CH$_2$)(CH$_2$CH$_2$CH$_2$SO$_2$CH=CH$_2$) | (18i) |

26. A reactive dye according to claim 8 in which D is a 1:1 copper complex azo dye containing benzene or naphthalene and the copper atom is bonded on each side to a metallizable group in ortho-position relative to the azo bridge.

27. A reactive dye according to claim 9 in which D$_1$, M and K are unsubstituted or substituted by hydroxy, amino, methyl, ethyl, methoxy, ethoxy, C$_2$-C$_4$-alkanoylamino, benzoylamino or halogen.

* * * * *